United States Patent
Nonaka et al.

(10) Patent No.: US 7,738,649 B2
(45) Date of Patent: Jun. 15, 2010

(54) COMPUTER SYSTEM USING IDENTIFICATION INFORMATION AND CONTROL METHOD THEREOF

(75) Inventors: Ryota Nonaka, Ohnojoh (JP); Koji Abe, Kasuga (JP); Shinya Isumi, Kasuga (JP); Toru Imamura, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1372 days.

(21) Appl. No.: 11/178,607

(22) Filed: Jul. 12, 2005

(65) Prior Publication Data

US 2006/0018454 A1 Jan. 26, 2006

(30) Foreign Application Priority Data

| Jul. 13, 2004 | (JP) | ............................ 2004-205657 |
| May 24, 2005 | (JP) | ............................ 2005-150392 |
| Jul. 8, 2005 | (JP) | ............................ 2005-199656 |

(51) Int. Cl.
H04M 7/00 (2006.01)

(52) U.S. Cl. ..................... 379/225; 379/226; 379/232

(58) Field of Classification Search ................ 379/226, 379/177, 242, 225, 232; 340/568.2
See application file for complete search history.

(56) References Cited

U.S. PATENT DOCUMENTS 4,654,640 A * 3/1987 Carll et al. ............... 340/568.2
5,379,433 A 1/1995 Yamagishi
5,544,235 A * 8/1996 Ardon ....................... 379/177
5,768,356 A * 6/1998 McKendry et al. .......... 379/242

FOREIGN PATENT DOCUMENTS

| JP | 02293930 | 12/1990 |
| JP | 2000333279 | 11/2000 |
| JP | 2001202493 | 7/2001 |
| JP | 2002049436 | 2/2002 |
| JP | 2002328753 | 11/2002 |
| JP | 2003242424 | 8/2003 |
| JP | 2003242425 | 8/2003 |
| JP | 2004094691 | 3/2004 |

* cited by examiner

*Primary Examiner*—Thjuan K Addy
(74) *Attorney, Agent, or Firm*—Dickinson Wright PLLC

(57) ABSTRACT

A computer system 1 has a PBX 2, a terminal device 3, and a management server 4. The PBX 2 has a line controller, an extension controller 2b, an interface, a memory that stores identification information and an enciphered file, a decoder that decodes the enciphered file, a comparator that compares the identification information and the enciphered file decoded by the decoder, and a controller. The terminal device 3 reads the identification information from the PBX 2 and transmits that to the management server 4. The management server 4 has an authenticator that receives a request for authentication when the terminal device 3 logs in, an issuer that issues the enciphered file according to the identification information, and a database that stores the issue date in correlating with the identification information.

15 Claims, 16 Drawing Sheets

FIG. 17

| EXPIRATION DATE | FUNCTION | POINT |
|---|---|---|
| ONE YEAR | A1 | 1 |
| ONE YEAR | A2 | 2 |
| • | • | • |
| THREE YEARS | B1 | 15 |
| THREE YEARS | B2 | 25 |
| • | • | • |
| FIVE YEARS | C1 | 20 |
| FIVE YEARS | C2 | 30 |
| • | • | • |

| POINT CARD ID | REMAINING POINT |
|---|---|
| 23874971 | 25 |
| 23874972 | 12 |
| 23874973 | 4 |
| 23874974 | 100 |
| 23874975 | 50 |
| • | • |
| • | • |
| • | • |

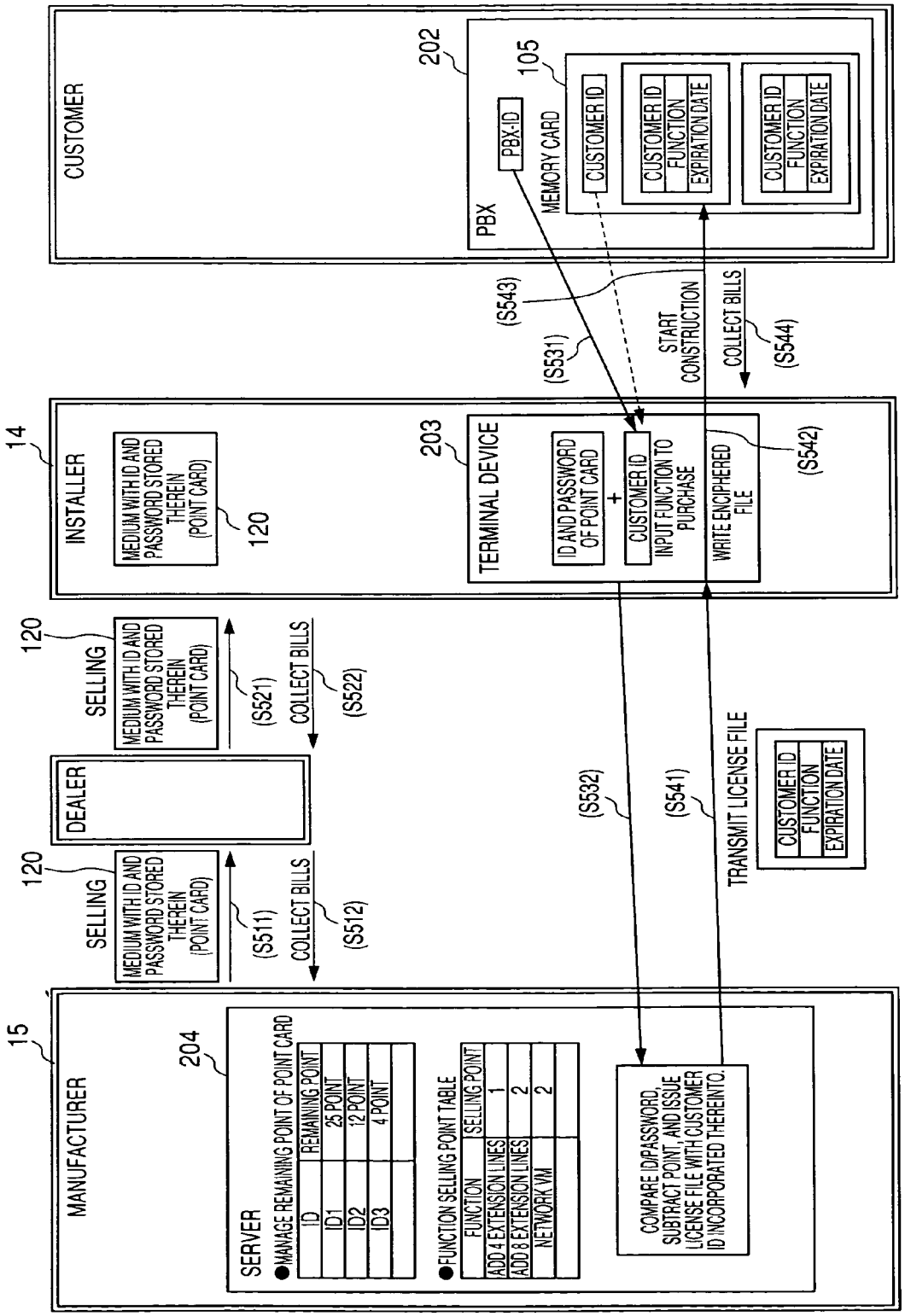

COMPUTER SYSTEM USING IDENTIFICATION INFORMATION AND CONTROL METHOD THEREOF

BACKGROUND OF THE INVENTION

The present invention relates to a computer system using identification information, which can prevent erroneous setting from occurring during a setting work of a computer, and to a control method of a computer system.

Further, the present invention relates to a computer system using identification information, which includes a management server that manages and gives a license to permit the execution of a program using the identification information and a computer that is executed with the given license, and to a control method of a computer system When a computer is installed, various kinds of setting information need be inputted in consideration of the installation circumstance or operation circumstance. If the setting information is erroneously inputted, the computer may not be normally operated. Accordingly, an installer who performs the setting work is required to perform the work accurately after understanding the installation circumstance, the functions of the computer or the like and a method of inputting the setting information.

For example, an exchange, which is an example of a computer, has a function of connecting an external line and an extension line and a function of connecting the extension lines to each other. In the exchange, setting for the phone number of the external line or the extension line, an incoming group, a function key of an extension phone connected to the extension line, and the like needs be performed. If setting is erroneous, an outgoing call from the extension line or an incoming call from the outside cannot be made, which causes an obstacle to business. If doing so, it will take much time to make clear the hardware trouble in the exchange or the simple erroneous input of a setting worker. Accordingly, the installer preferably performs the setting work after receiving training for the installation of the exchange and being skilled.

Since the installer purchases the exchange from one distributor of a manufacturer and a dealer, it is difficult for the manufacturer or the dealer to grasp all installers through the management. Even when an installer who does not receive training on the installation and lacks skill installs the exchange, it is difficult for the manufacturer or the dealer to pay attention to the installer through the management. Accordingly, when the trouble described above occurs, the manufacturer or the dealer, as well as the installer, does not cope with the trouble, which causes a problem on credit.

When the manufacturer or the dealer cannot grasp all installers, other bad effects may occur. In the computer, the term of repairing in which a trouble occurring at the beginning of operation is repaired free is provided as the free warranty term through the service of the manufacturer. However, if the trouble occurs in the installed computer, even when the free warranty term is expired, the installer may erroneously report the operation date, and thus the manufacturer or the dealer may provide the installer with the parts for repairing free.

That is, as regards the installation work, an installer who receives training provided by the manufacturer or the dealer and is confirmed by the manufacturer or the dealer preferably performs the installation work of the computer. However, at present, as for the installation work, an installer who does not receive training and lacks skill and an installer who receives regular training are intermingled.

In order to prevent the installer from erroneously reporting the operation date, a technology has been suggested in which, when the program is incorrectly operated, the execution of the program stops (for example, see JP-A-2-293930). In a method of preventing a fraudulent use described in JP-A-2-293930, in order to cause the content of an original disc not to be copied, an identification code is stored in advance in a ROM region in which writing of the disc cannot be performed. Then, when the program is executed, the identification code is read out from the ROM region to judge whether or not the identification code is one required for executing the program. By doing so, it is judged whether or not it is the original disc. Then, if it is judged that it is not the original disc, the execution of the program stops.

Another customer may purchase additionally required functions at option, in addition to basic functions. It is preferable in that the customer purchases the required functions at low cost. For example, a private branch exchange (hereinafter, referred to as PBX), which is an example of a computer, has a function of connecting the external line and the extension line and a function of connecting the extension lines to each other. If connectable extension lines are gradually sold under the license, the customer having a small size can purchase at low cost and expand the functions, if necessary, afterward, thereby ensuring ease of purchase.

Selling under the license is given through a memory card in which available functions are stored. That is, a customer who wants to use a function A and a function B purchases a memory card in which the license to the function A and the function B is stored. Then, the purchased memory card is installed in the PBX and the restriction to the function A and the function B is released, and the function A and the function B are enabled.

As a technology for restricting the execution of the program (for example, see JP-A-2001-202493), a technology has been suggested in which an application with an executable expiration date is stored in an IC card.

In the technology described in JP-A-2-293930, based on the previously stored identification code, it is judged whether to execute or to stop the program, but the manufacturer cannot grasp that the product starts to be used. That is, if the program is executed in a state that the manufacturer cannot grasp, the warranty term for the product cannot be accurately managed.

In the technology described in JP-A-2001-202493, for example, when the customer who purchases the memory card with the license to the function A and the function B stored therein wants to purchase a function C additionally, he needs to purchase newly a memory card in which the license to the function C, in addition to the function A and the function B, is stored. Accordingly, the customer purchases again the functions A and B, which are bought already by the customer.

Further, the dealer needs to prepare memory cards in which various functions are combined and the management is complicated.

SUMMARY OF THE INVENTION

Accordingly, it is an object of the present invention to provide a computer system using identification information, which can prevent an installer, who lacks skill, from being involved in a setting work and can accurately grasp the time at which a computer operates, and a control method of a computer system.

Further, it is another object of the present invention to provide a computer system using identification information, which can give a license, without complex management, and a control method of a computer system.

According to a first aspect of the present invention, a computer system includes a private branch exchange (PBX) that connects calls among a plurality of extension lines or among extension lines and external lines and that is connected to another terminal device, a terminal device that is connected to the PBX and that is connected to a management server via a network, and the management server that is connected to the terminal device via the network. The PBX has a line controller that controls connection or disconnection with respect to an incoming call or an outgoing call from a public network or a private line via an external line, an extension controller that controls connection or disconnection of an extension line and the call, an interface that connects the PBX to the terminal device, a memory that stores a control program of the PBX and identification information to identify the PBX from another PBX; a decoder that decodes an enciphered file serving as enciphered authentication information, a comparator that compares the identification information to the enciphered file decoded by the decoder, and a controller that controls the PBX based on the stored content of the memory. The terminal device has a local interface that connects the terminal device to the PBX, a network interface that connects the terminal device to the management server via the network, a reader that reads the identification information from the PBX a memory that stores the identification information, the enciphered file, and the control program of the terminal device, and a terminal controller that controls the local interface, the network interface, and the reader. The management server has a network interface that connects the management server to the terminal device via the network, an authenticator that receives a request for authentication when the terminal device logs in the management server, an issuer that issues the enciphered file enciphered according to the identification information received from the terminal device after the authentication of the authenticator, and an installation date management database that stores a date, on which the enciphered file is issued, in correlating with the identification information. The PBX further has a function activator that assigns whether to restrict or activate a part or all of operational functions of the PBX, and the controller controls the function activator based on the comparison result of the comparator to assign whether to restrict or activate the part or all of the operational functions of the PBX.

Further, according to a second aspect of the present invention, there is provided a control method of a computer system which has a private branch exchange (PBX) that connects calls among a plurality of extension lines or among extension lines and external lines and that is connected to another terminal device, a terminal device that is connected to the PBX and that is connected to a management server via a network, and the management server that is connected to the terminal device via the network. The PBX has a line controller that controls connection or disconnection with respect to an incoming call or an outgoing call from a public network or a private line via an external line, an extension controller that controls connection or disconnection of an extension line and the call, an interface that connects the PBX to the terminal device, a memory that stores a control program of the PBX and identification information to identify the PBX from another PBX, a decoder that decodes an enciphered file serving as enciphered authentication information, a comparator that compares the identification information to the enciphered file decoded by the decoder, and a controller that controls the PBX based on the stored content of the memory. The terminal device has a local interface that connects the terminal device to the PBX a network interface that connects to the management server via the network, a reader that reads the identification information from the PBX, a memory that stores the identification information, the enciphered file, and the control program of the terminal device, and a terminal controller that controls the local interface, the network interface, and the reader. The management server has a network interface that connects the management server to the terminal device via the network, an authenticator that receives a request for authentication when the terminal device logs in the management server, an issuer that issues the enciphered file enciphered according to the identification information received from the terminal device after the authentication of the authenticator, and an installation date management database that stores a date, on which the enciphered file is issued, in correlating with the identification information. The control method of a computer system includes a PBX-ID reading step of connecting the terminal device to the interface of the PBX via the local interface thereof to read the identification information from the PBX by the reader and to store the identification information in the terminal device, an authentication issue step of connecting the terminal device to the management server via the network interface thereof and, after passing the authentication by the authenticator, transmitting the identification information stored in the terminal device to the management server, an issue step of allowing the management server to issue the enciphered file to the terminal device based on the identification information, an enciphered file writing step of allowing the terminal device to store the enciphered file in the memory and to be connected to the interface of the PBX, and a function activating step of allowing the controller of the PBX to control a function activator, based on the comparison result of the comparator, to restrict a part or all of operational functions of the PBX when the comparison result is in discord and to control the function activator to enable the part or all of the operational functions of the PBX when the comparison result is in concord.

Further, according to a third aspect of the present invention, there is provided a private branch exchange (PBX) that connects calls among a plurality of extension lines or among extension lines and external lines, comprising: a line controller that controls connection or disconnection with respect to an incoming call or an outgoing call from a public network or a private line via an external line; an extension controller that controls connection or disconnection of an extension line and the call; a memory that stores a control program of the PBX and identification information to identify the PBX from another PBX; a decoder that decodes an enciphered file enciphered by another source other than the PBX; a comparator that compares the identification information to the enciphered file decoded by the decoder, a function activator that assigns whether to restrict or activate a part or all of operational functions of the PBX; and a controller that controls the function activator based on the comparison result of the comparator to assign whether to restrict or activate the part or all of the operational functions of the PBX Further, according to a fourth aspect of the present invention, there is provided a controlling method of a private branch exchange (PBX) that connects calls among a plurality of extension lines or among extension lines and external lines, the PBX comprising: a line controller that controls connection or disconnection with respect to an incoming call or an outgoing call from a public network or a private line via an external line; an extension controller that controls connection or disconnection of an extension line and the call; a memory that stores a control program of the PBX and identification information to identify the PBX from another PBX; a decoder that decodes an enciphered file enciphered by another source other than the PBX; a comparator that compares the identification information to the enciphered file decoded by the decoder, a function activator that assigns whether to restrict or activate a part or all of operational functions of the PBX; and a controller, the method comprising: a decoding step of decoding the enciphered file by the decoding means; a comparing step of comparing the identification information to the enciphered file decoded in the decoding step by the comparator; a function activating step of assigning whether to restrict or activate the part or all of the operational functions of the PBX by controlling the function activator based on the comparison result of the cooperating step.

According to the computer system of the present invention, at the time of installation, if the content of the enciphered file is in discord with the identification information stored in the memory of the computer, the functions of the computer are restricted. The identification information is information to identify the PBX from another PBX and is stored in a memory 2d by a manufacturer 15 at the time of manufacture. Further, the log-in information is a code to identify an installer 14 and can specify an installer 14 who requests to issue authentication information. By doing so, it is possible to prevent a worker, who lacks skill, from being involved in the setting work.

Further, since the issue date of the authentication information is stored in the installation date management database in correlating with the identification information, the management server can accurately grasp the operation date of the computer.

According to the present invention, a remaining point according to a sale price of a sold point card is managed in correlating with point card identification information given to a point card. When a license file that includes classification information of licenses for permitting the execution of a program is issued, a point relating to the license issue, which is allocated for each license, is subtracted from the remaining point, and the subtraction result is set as the remaining point again. The computer can delete the restriction of the functions executed by the program according to the classification information of the license file issued from the management server.

Accordingly, according to the present invention, the installer, who purchases the point card in advance, can obtain the license file from the management server for each function of the program according to the remaining point and sell the license file to the customer. As a result, the license can be given with no complex management of the function and the price for each installer.

BRIEF DESCRIPTION OF THE DRAWINGS

FIG. 17 is a diagram illustrating recorded contents of a point management database 4e.

FIG. 18 is a diagram illustrating an operation of the computer system of FIG. 12.

DETAILED DESCRIPTION OF THE DRAWINGS

First Embodiment

The configuration of a computer system 1 according to a first embodiment of the present invention will be described with reference to FIGS. 1 to 5. Hereinafter, when the present invention is described by way of a specified embodiment, a PBX, a terminal, and a server are individually referred to according to the functions and features of devices constituting the system. Then, these devices have characteristic functions according to software of the computer. Therefore, these devices are generally referred to as the computer and the associated entire system is referred to as the computer system.

Figure 1:
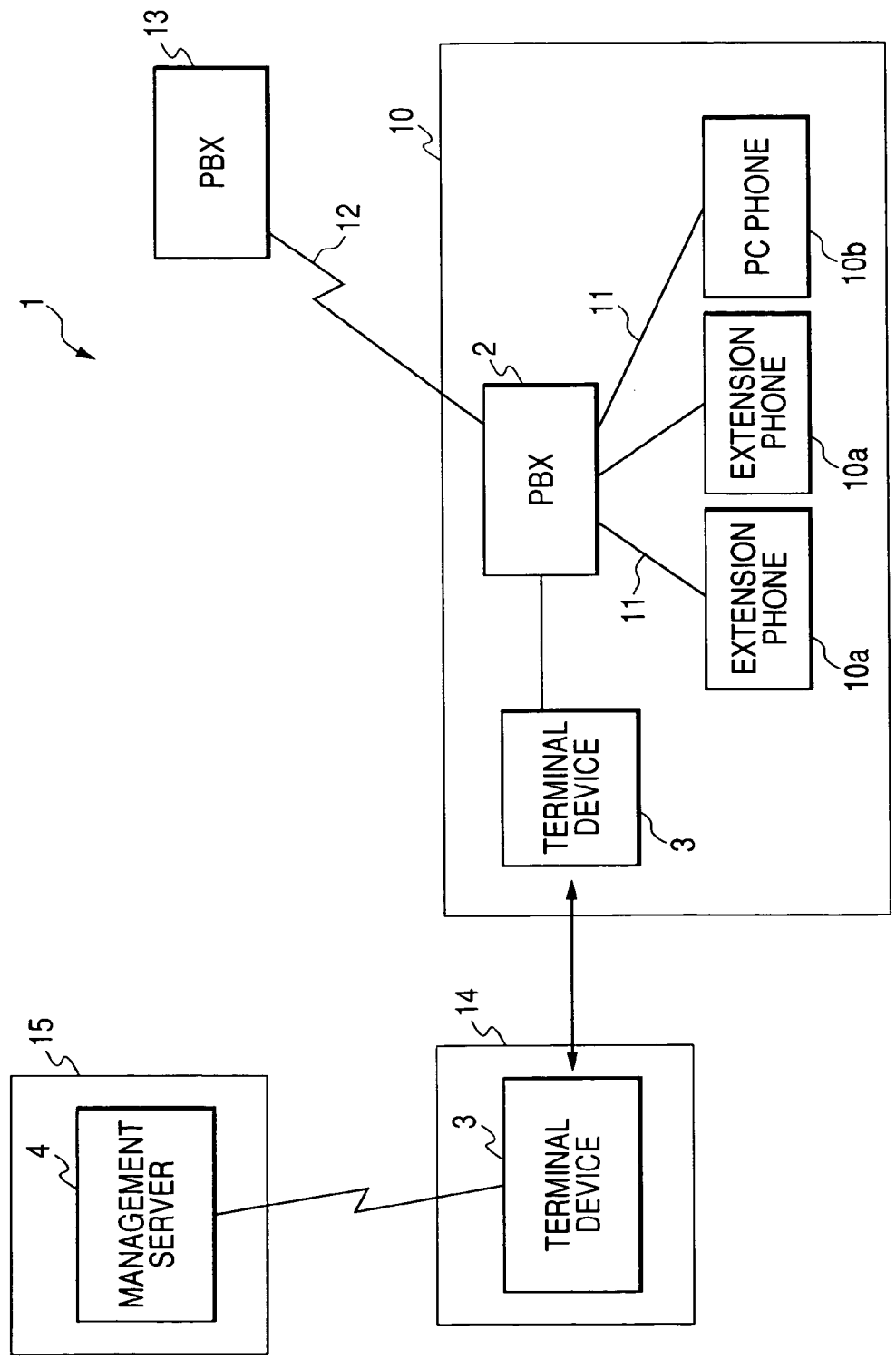
FIG. 1 is a diagram showing a configuration of a computer system according to a first embodiment of the present invention.
Figure 2:
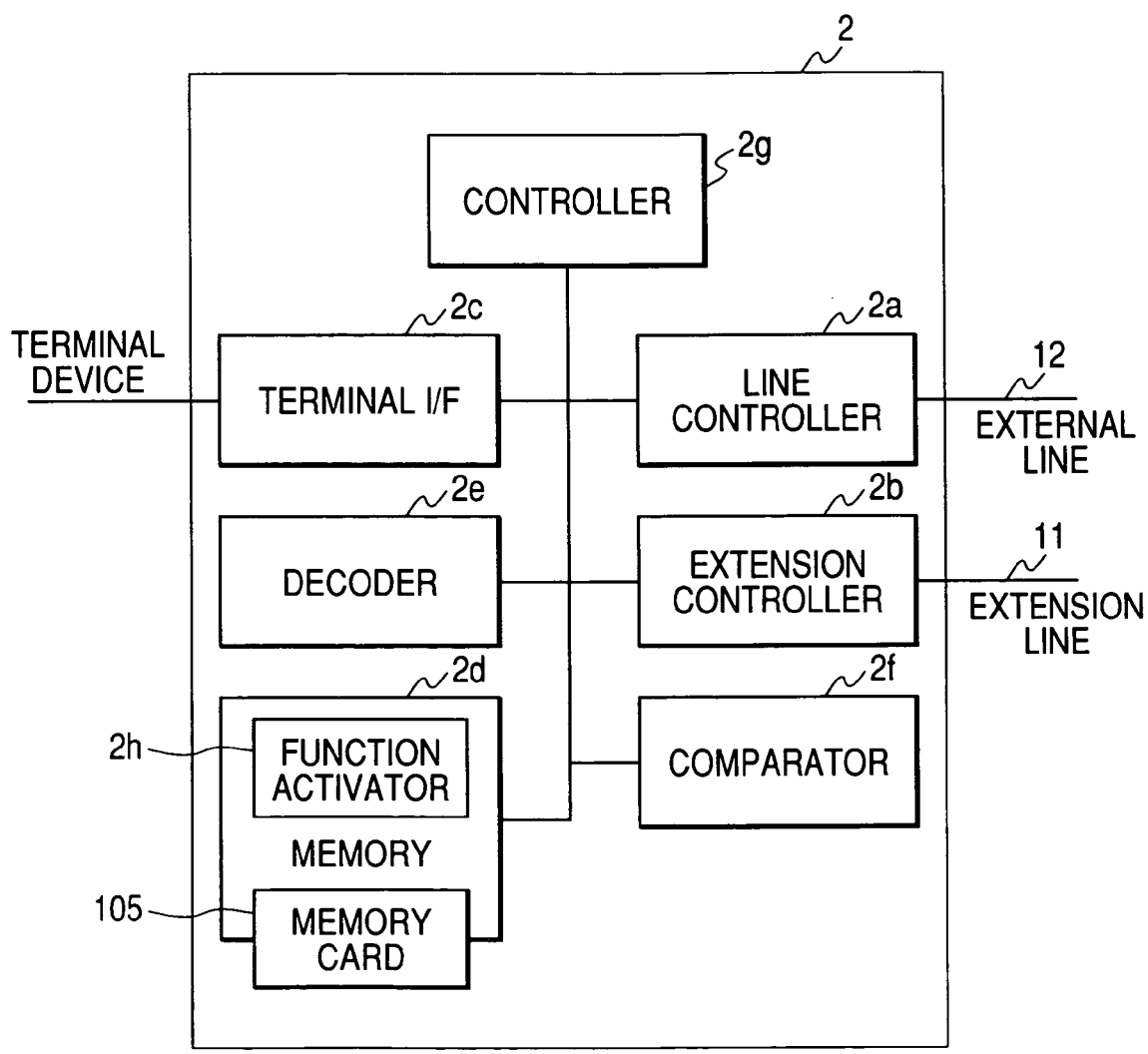
FIG. 2 is a diagram showing a configuration of a private branch exchange of FIG. 1.
Figure 3:
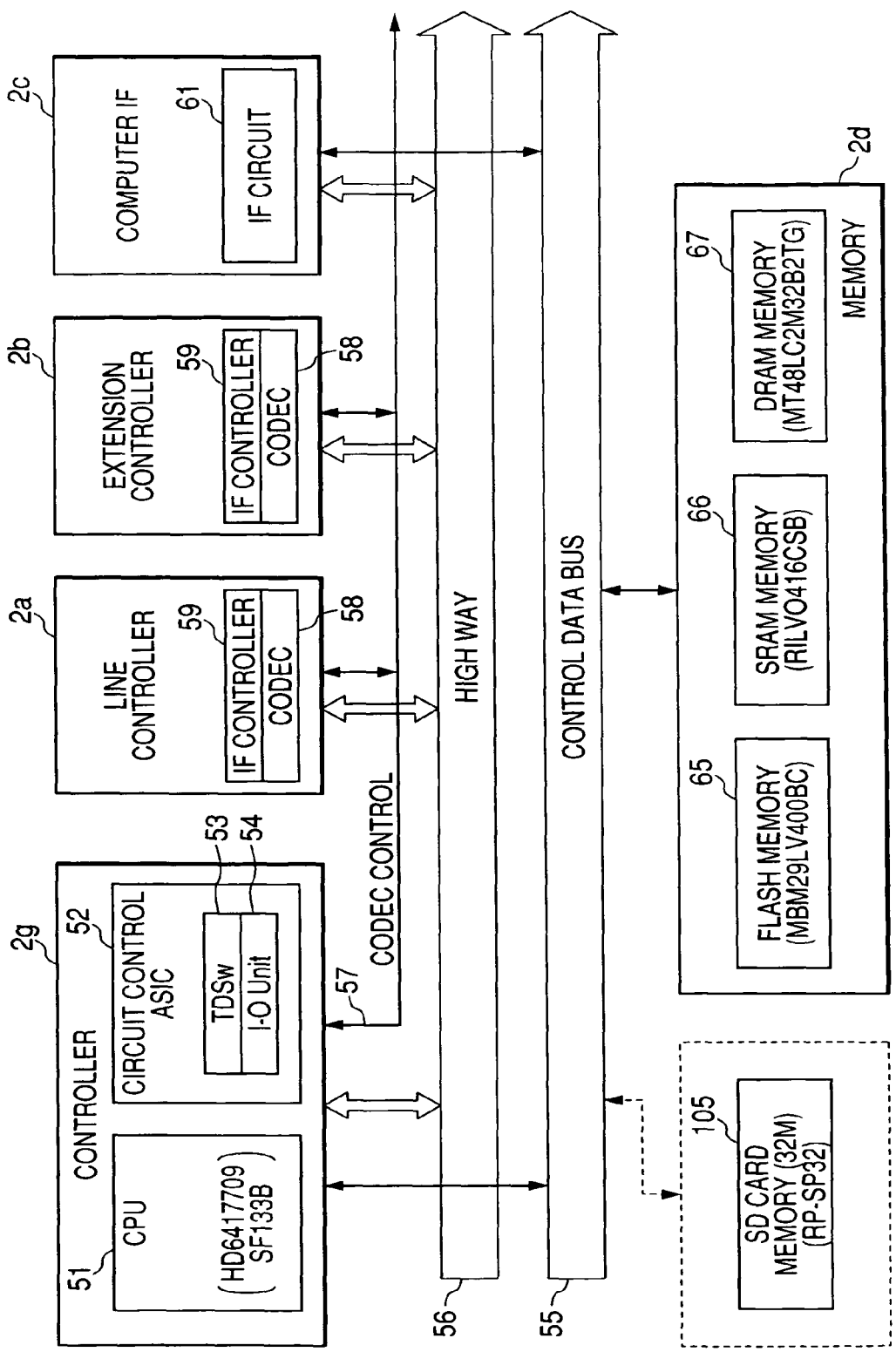
FIG. 3 is a diagram showing a hardware configuration of FIG. 2.
Figure 4:
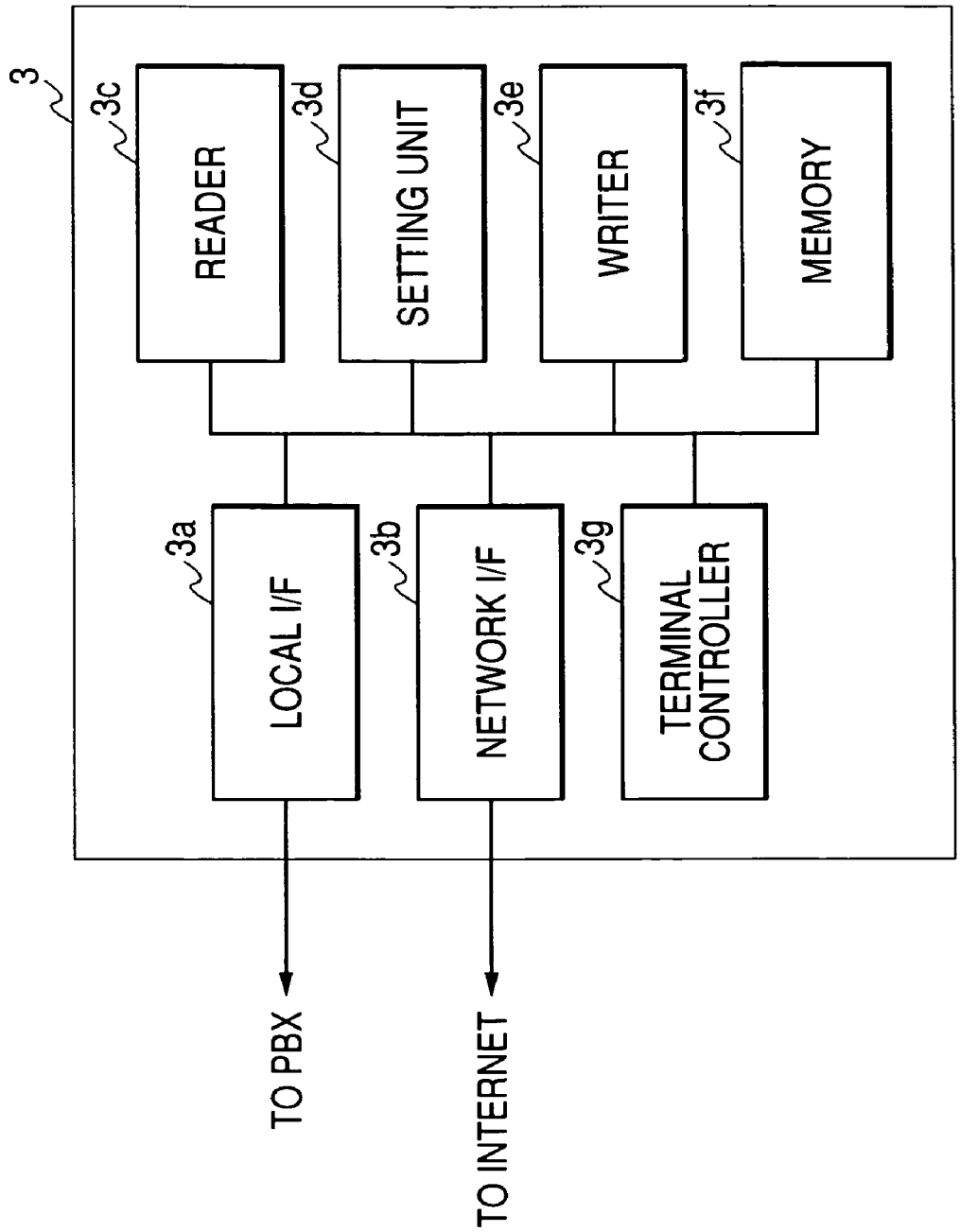
FIG. 4 is a diagram showing a configuration of a terminal device of FIG. 1.
Figures 5, 6:
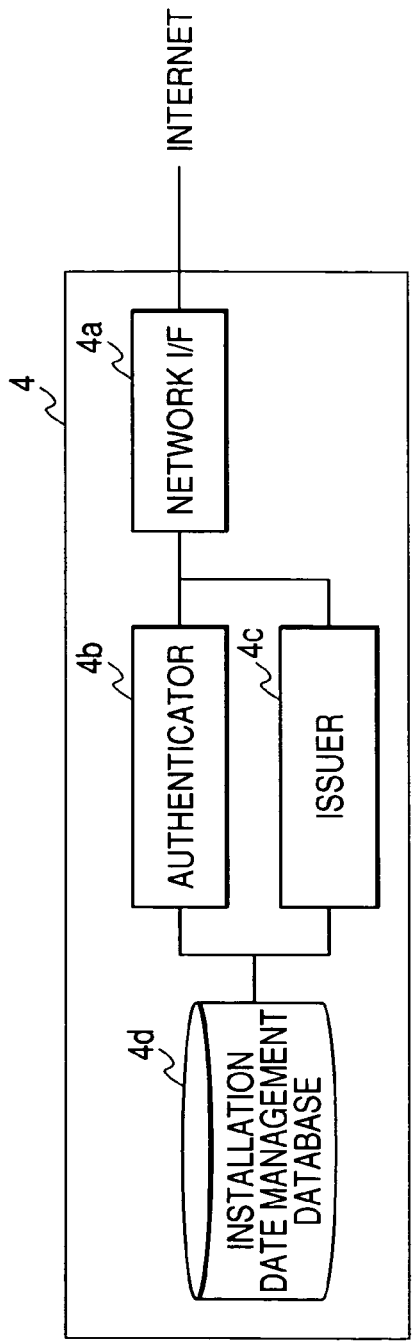
FIG. 5 is a diagram showing a configuration of a management server of FIG. 1.
FIG. 6 is a diagram illustrating recorded contents of an installation date management database of FIG. 5.

FIG. 1 is a diagram showing the configuration of the computer system according to the first embodiment of the present invention. FIG. 2 is a diagram showing the configuration of a private branch exchange of FIG. 1. FIG. 3 is a diagram of a hardware configuration of FIG. 2. FIG. 4 is a diagram showing the configuration of a terminal device of FIG. 1. FIG. 5 is a diagram showing the configuration of a management server of FIG. 1.

As shown in FIG. 1, the computer system 1 has a private branch exchange (hereinafter, referred to as PBX) 2, which is an example of the computer, a terminal device 3, and a management server 4. The PBX 2 is provided in a company 10, which is a new customer, for example, and, when installed, is connected to a plurality of extension phones 10a disposed in the company 10 or a PC phone 10b having a telephone function by an extension line 11. Then, the PBX 2 is connected to another exchange 13 or a central office exchange (not shown) via an external line 12. The PBX 2 connects a call between the extension phones 10a or between the extension phone 10a and the external line 12.

The terminal device 3 is connected to the PBX 2 and is used to set setting information, such as operational functions of the PBX 2. In a case of a portable notebook-type personal computer, at the time of the installation work, the terminal device 3 can be carried to the company, which is an installation destination, and is connected to the PBX 2, such that a setting work of the setting information to the PBX 2 or the like can be performed. Further, the terminal device 3 is connected to the management server 4 via a network (not shown), such as Internet or the like. An installation work, in which the terminal device 3 operates to set the PBX 2, is performed by an installer 14. Further, the management server 4, to which the terminal device 3 accesses via the network, is a server, which is managed by a manufacturing company 15 (manufacturer or dealer), who manufactures the PBX 2.

The terminal device 3 and the management server 4 described above are named individually according to the functions, but have characteristic functions according to software in a general computer or a general personal computer (PC). For this reason, in the present invention, the terminal device 3 and the management server 4 may be constituted by well-known computers, which are generally used, and thus the detailed descriptions thereof will be omitted.

Next, the configuration of the PBX 2 will be described with reference to FIG. 2. In FIG. 2, the PBX 2 has a line controller 2a that controls the connection to the external line 12, an extension controller 2b that controls the connection to the extension line 11, and an interface 2c that enables the connection to the terminal device 3.

Further, the PBX 2 has a memory 2d, a decoder 2e, a comparator 2f, and a controller 2g.

The line controller 2a controls connection or disconnection with respect to an incoming call or an outgoing call from a general public network or a private line via the external line 12. The extension controller 2b controls connection or disconnection between the extension line 11 and the call.

The interface 2c is a unit for connecting the PBX 2 to the terminal device 3 in order to construct various computer systems. As the circuit configuration, a general interface IC is used. For example, a USB (Universal Serial Bus), which is a general interface, a LAN (Local Area Network), such as 100 Base-T, RS-232C, in which a bidirectional serial communication can be performed, or a bidirectional parallel interface, or the like can be used. All of them are installed in the personal computer as a standard.

As the memory 2d, according to the contents stored therein, for example, in order to store various kinds of setting information, an SRAM (Static Random Access Memory) is used through a battery backup. As a work memory for an arithmetic process, a DRAM (Dynamic Random Access Memory) is used. Further, in order to start the program, a flash memory for a boot program and a detachable card memory (memory card 105) for storing the program are used. The memory configurations described above are examples for a system configuration to the minimum. According to the functions of the PBX the number of memories may be increased. Hereinafter, in the embodiment of the present invention, these memory elements are generally referred to as the memory 2d.

Moreover, according to the contents stored therein, the elements used for the memory 2d may be changed. In particular, as for identification information described below, a nonvolatile memory, such as a flash memory or the like, is preferably used, in which the content can be preserved even when a power supply is not applied. Accordingly, new convenience can be achieved, which win be described in another embodiment.

The memory 2d stores the identification information and enciphered authentication information (enciphered file). Here, the identification information is information to identify the PBX from another PBX. The identification information is registered in advance by the manufacturer 15, who manufactures the PBX 2, and is stored in the memory 2d by the manufacturer 15 when the PBX 2 is manufactured. Once if the identification information is stored in the memory 2d, rewriting cannot be performed.

As the identification information, information relating to at least one of a model name, a serial number, a manufacture date, a specification classification, a manufactory, and a customer D, or a combination of them can be used. As long as it is possible to cause the PBX to be identified from another PBX any information, other than the above-described information, can be used as the identification information. Since the information including the information to identify the PBX from another PBX can be used as the identification information, other information may be added to the information to identify the PBX from another PBX and may be stored in the memory 2d. With the identification information, since it is possible to identify the PBX from another PBX and specify, hereinafter, the identification information is referred to as a PBX-ID (Identification).

Further, the enciphered authentication information is a data file, which is enciphered by the management server 4 based on the PBX-ID through a management processing (information processing required for authentication) described below. Hereinafter, the enciphered authentication information is simply referred to as an enciphered file.

The decoder 2e decodes the enciphered authentication information (enciphered file).

The comparator 2f compares the PBX-ID read from the memory 2d to the decoded enciphered file and notifies the controller 2g of the comparison result.

The controller 2g processes the following functions. The controller 2g has a function of controlling an exchange operation between the external line 12 and the extension line 11 and between the extension lines 11. Further, controller 2g has a function of performing data communication with the extension phones 10a via the extension controller 2b. In addition, the controller 2g has a function of performing data communication with the terminal device 3 via the interface 2c. The controller 2g restricts a part or all of operational functions of the PBX 2 when the comparison result notified from the comparator 2f is in discord.

A function activator 2h has a function of assigning whether to restrict or activate the part or all of the operational functions of the PBX 2. The function activator 2h operates as a program of a functional block to assign to restrict or stop the programs of various operational functions of the PBX 2 stored in the memory 2d. The controller 2g stops a predetermined flag of the function activator 2h, when the comparison result of the comparator 2f is in discord, to restrict the part or all of the operational functions of the PBX 2. The controller 2g activates the predetermined flag of the function activator 2h, when the comparison result of the comparator 2f is in concord, to enable a predetermined operational function or all operational functions of the PBX 2.

As for the restriction of the operational function, for example, the extension controller 2b may be controlled, thereby restricting an incoming call or an outgoing call to the extension phone 10a or the PC phone 10b (to functionally stop a part or all of extension line ports). Alternatively, the line controller 2a may be controlled, thereby restricting an incoming call from the external line 12 and an outgoing call to the external line 12 (to functionally stop a part or all of the external line ports). At least one of the restrictions to the extension controller 2b and the line controller 2a or the range of the ports to be functionally stopped can be suitably performed according to the installation circumstance.

FIG. 3 is a diagram of the hardware configuration of the exchange of FIG. 1. The hardware configurations of the functions described with reference to FIG. 2 will be described in detail. The controller 2g has a CPU 51 and a circuit control ASIC 52.

The CPU 51 is a general one-chip CPU and, for example, is HD6417709SF133B, which is available from HITACHI. The circuit control ASIC 52 includes a time-sharing switch unit 53 that performs an exchange control and an IO unit 54 that performs an input/output control with respect to various interfaces. After the respective units are integrated into a large-scale integrated circuit, a peripheral control circuit, which is most suitable for the present embodiment, is integrated thereinto, such that the ASIC (Application-Specific Integrated Circuit) is constructed.

As the content, a call memory and a peripheral control circuit, which controls the addresses of the call memory according to time slots, are included. Like the general time-sharing switch, the call memory or the peripheral control circuit is integrated into a large-scale integrated circuit (LSI) and is provided as one general IC. Moreover, the operation content thereof is described in, for example, JP-A No. 2002-333279 and thus the description thereof will be omitted.

A control data bus 55 is a control data bus to the CPU 51 and includes an address bus, a data bus, and a status bus. All of them have a general bus configuration depending on the CPU 51.

A highway 56 is a highway of time-sharing data required for a general time-sharing exchange control. The CPU 51 generates a CODEC (COder-IDECorder) control 57 to specify a peripheral terminal via the control data bus 55 and the highway 56, together with the circuit control ASIC 52. Accordingly, CODECs 58 for the line controller 2a and the extension controller 2b, which are connected to the CODEC control 57, can be controlled.

The above-described line controller 2a and the extension controller 2b have the substantially same internal configuration. The controller 2g (the CPU 51 and the circuit control ASIC 52) transmits control signals to the CODECs 58 via the CODEC control 57. The CODECs 58 are, for example, CODEC ICs, which are available from Infineon Technologies AG. The CODECs 58 write input signals from the respective interfaces into time slot locations on the highway 56 according to physical locations of the respective interfaces. Further, to the contrary, the CODECs 58 read data from the time slot locations according to the physical locations of the respective interfaces and output data to the respective interfaces.

Each of IF controller 59 has a matching element that takes impedance matching between the extension line 11 and the external line 12, a line driver receiver that transmits and receives a signal, a signal conversion between analog and digital, and an input/output control, and is controlled by the CODEC 58. This is a general interface control circuit.

As an IF circuit 61, as described above, a general interface IC corresponding to the USB, IEEE 802.3, or RS-232C is used. Further, an interface circuit to the control data bus 55 is integrated into the IF circuit 61. Moreover, in detail, like the line or extension controller 2a or 2b, a relay circuit that performs a timing control between the data line and the control data bus 55 may be installed, but the content of the relay circuit has no relation to the subject matter of the present invention and thus the detailed description thereof will be omitted.

Further, the number of line or extension controllers 2a or 2b or interfaces 2c is not limited to one, as shown in the drawings. For example, a plurality of controllers or interfaces may be provided. In addition, the number of extension controllers 2b is not limited to two, as shown in FIG. 1, but a plurality of extension controllers may be provided. The number of controllers or interfaces is suitably defined according to the ability required for the entire system of the exchange 2. The memory 2d as a whole refers to the combination of a plurality of memory elements. The memory elements are constituted as follows. Reference numeral 65 denotes a flash memory, that is, a nonvolatile memory. With this feature, the flash memory stores the boot program when the system starts. For example, MBM29LV400BC, 4 Mbit Flash is used, which is available from FUJITSU. Reference numeral 66 denotes an S RAM memory, and stores various setting data and preserves stored data through a battery backup. For example, R1LV0416CSB, 4 Mbit SRAM is used, which is available from RENESAS Technology. Reference numeral 67 denotes a DRAM memory and stores a system operating program and various setting data. This is a volatile memory which is required for a memory preservation operation, and thus, in this case, data preservation through the battery backup is not performed. For example, MT48LC2M2B2TG; 64 Mbit DRAM is used, which is available from Micron Technologies, Inc.

Reference numeral 105 denotes an SD card memory (Secure Digital memory card) and is a nonvolatile memory. For example, RP-SP032 of 32 Mbyte is used, which is available from Panasonic. This is a detachable card-type memory, such that a portion of the stored content, such as the system operating program of the exchange 2, can be rewritten and the card itself can be exchanged. In particular, in the present invention, with such a feature, the enciphered file can be stored therein and operated. Moreover, in FIG. 3, a dotted line of the SD card memory 105 indicates that the SD card memory is detachable (that is, a detachable memory).

Next, the configuration of the terminal device 3, which is used by the installer 14, will be described with reference to FIG. 4. In FIG. 4, the terminal device 3 has a local interface 3a that connects to the PBX 2 and a network interface 3b that connects to the management server 4. Other configuration contents are listed as the above-described functional units with respect to software having characteristic functions in a general computer or a general personal computer (PC). In the present invention, the detailed structure of the terminal device 3 is described to be constituted by a well-known computer, which is generally used, and thus the detailed descriptions thereof will be omitted.

The local interface 3a is constituted by the same interface as the interface 2c of the PBX 2 in order to connect to the PBX 2. Moreover, here, the term 'local' means that the connection can be made within the range of the computer system of the present invention. For example, even when the interface as hardware is general, processing software for signal communication may include a processing peculiar to the PBX 2 and the local interface 3a of the present embodiment.

The network interface 3b is a well-known unit that is connected to the Internet, which is an example of the network. As this interface, for example, the LAN, which serves as an interface to a network repeater, such as a hub or a router (not shown), RS-232C, which serves as an interface to a modem and in which a bidirectional serial communication can be performed, or the like can be used. That is, the network described herein means that communication can be performed to the well-known network using general hardware and software.

The terminal device 3 further includes a reader 3c that reads the PBX-ID (identification information) from the PBX 2, a setting unit 3d that outputs the setting information for setting the operational functions of the PBX 2, such as an extension number, an abbreviated dial, grouping, or the like, a writer 3e that outputs the enciphered file to be written into the PBX 2, a memory 3f that stores the PBX-ID read from the PBX 2 or the enciphered file received from the management server 4, and a control program of the terminal device itself.

A terminal controller 3g writes web page information received from the management server 4 via the network interface 3b, the enciphered file (license file) described below, or the like into the memory 3f or transmits the PBX-ID (for example, a customer ID described below or the like) to the management server 4 via the network interface 3b.

The terminal device 3 may be connected to the PBX 2 when outputting the setting information to the PBX 2. Further, the terminal device 3 may be connected to the management server 4 when transmitting the PBX-ID to the management server 4. Here, the terminal device 3 is not necessarily connected to the PBX 2 and the management server 4 simultaneously. This is because the local interface 3a and the network interface 3b perform the communication operation individually and thus both do not necessarily maintain communication simultaneously. By doing so, when a portable notebook-type personal computer is used as the terminal device 3, work convenience can be exhibited.

Next, the management server 4, which is managed by the manufacturer or the dealer, will be described in detail with reference to FIG. 5. As for the configuration of the management server 4, the functional units are listed with respect to software having characteristic functions in a general computer or a general personal computer (PC). In the present invention, the detailed structure of the management server 4 is described to be constituted by a well-known computer, which is generally used, and thus the detailed descriptions thereof will be omitted.

In FIG. 5, the management server 4 has the following parts. A network interface 4a transmits web pages to the terminal device 3 via the network, such as the Internet, or the like or receives data transmitted from the terminal device 3. The network interface 4a is a well-known unit that is connected to the Internet, which is an example of the network. As this interface, for example, the LAN, which serves as an interface to a network repeater, such as a hub or a router (not shown), RS-232C, which serves as an interface to a modem and in which a bidirectional serial communication can be performed, or the like can be used.

An authenticator 4b requests authentication when the terminal device 3 logs in the web page of the management server 4. After authentication, an issuer 4c enciphers authentication information according to the PBX-ID identification information) transmitted from the terminal device 3 and issues that as a data file, that is, as the enciphered file. The content of the processing to encipher is performed using a well-known general enciphering processing technology. Moreover, the enciphering processing technology has no relation to the subject matter of the present invention, and thus, as described above, it is described herein that the general enciphering processing is used and the detailed description of the enciphering processing will be omitted.

An installation date management database 4d stores the PBX-ID transmitted from the terminal device 3, log-in information used at the time of authentication, and a date, on which the enciphered file is issued, in correlating with one another.

The log-in information is a code, which is registered and issued by the manufacturer or dealer, to identify an installer 14 who receives training provided by the manufacturer or dealer in advance. With the log-in information, an installer 14 who requests to issue the authentication information can be specified.

The issuer 4c has a function of enciphering the PBX-ID to create an information file required for authentication. The enciphered file enciphered by the issuer 4c can be decoded by the decoder 2e of the PBX 2.

FIG. 6 is a diagram illustrating the recorded contents of the installation date management database 4d of FIG. 5. FIG. 6 illustrates a case in which the PBX-ID, the date, and the installer 14 are managed in correlating with one another. The entire installation date management database 131 corresponds to the installation date management database 4d of FIG. 5. Reference numeral 132 denotes PBX-ID data serving as the identification information. Reference numeral 133 denotes date data and represents the date on which the enciphered file corresponding to the PBX-ID 132 is issued. Reference numeral 134 denotes dealer ID data and is a code, which is registered and issued by the manufacture or dealer, to identify an installer 14. In addition, there is a case in which an installation location (delivery destination) is added as associated information. Further, dealer ID data 134 is described to be included in the installation date management database 131, but dealer ID data 134 may be independently used as the log-in information. This is because, if the PBX 2 is identified and the installer 14 is specified, the date management can be performed, as long as the correlation of data can be confirmed in a database.

—Overall Operation—Log-In—

Figure 7:
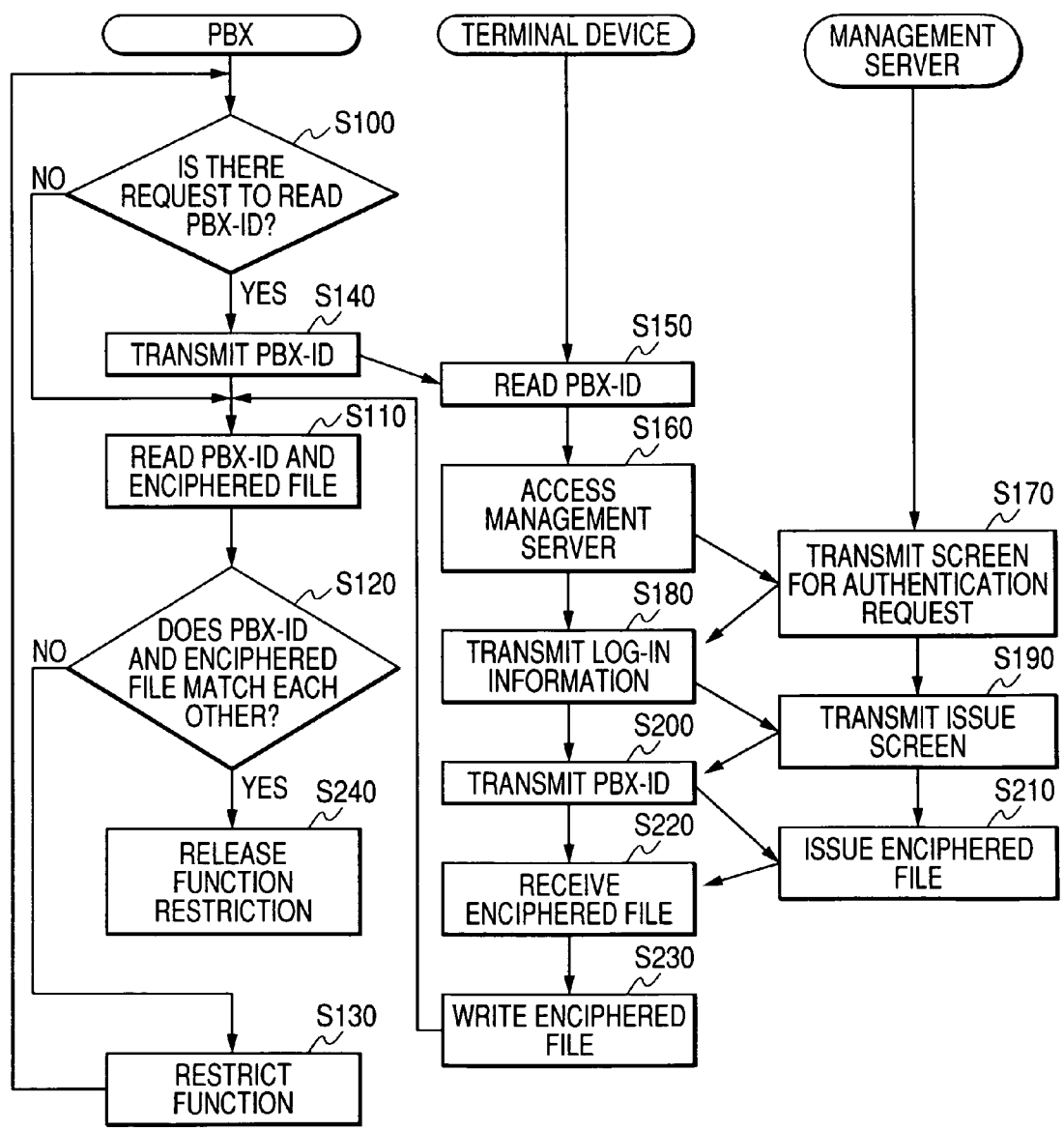
FIG. 7 is a flowchart illustrating an operation of the computer system of FIG. 1.

The operation of the computer system according to the embodiment of the present invention constituted in such a manner will be described with reference to FIG. 7. FIG. 7 is a flowchart illustrating the operation of the computer system of FIG. 1. The flowchart of FIG. 7 shows the operation when the installer 14 installs the PBX 2 shown in FIG. 1 in the company 10. Therefore, it is assumed that the PBX 2 is regularly shipped with the PBX-ID and the terminal device 3 is connected to the PBX 2 for the installation work.

Further, it is assumed that the installer 14 receives training for the installation of the PBX 2 and has a skill for installation. Then, it is assumed that the log-in information to be used for the authentication when the terminal device 3 logs in the management server 4 is issued from the dealer.

First, if the power supply is applied, the PBX 2 becomes an idle state. At that time, the PBX 2 judges whether or not there is a request to read of the PBX-ID from the terminal device 3 (Step S100). In the step S100, when there is no request to read of the PBX-ID from the terminal device 3, the process progresses to a step S110.

The controller 2g reads the PBX-ID from the memory 2d and also reads the enciphered file (Step S110).

If necessary (in the first embodiment, when the power supply is applied), the controller 2g causes the decoder 2e to decode the enciphered file read. Further, the controller 2g causes the comparator 2f to compare the PBX-ID read and the decoded enciphered file and the comparator 2f notifies the controller 2g of the comparison result (Step S120).

If the comparison result notified in the step S120 is in discord, the controller 2g notifies the function activator 2h of a purport to restrict the function such that the extension controller 2b does not operate (Step S120N). The function activator 2h assigns an activation flag of the function relating to the extension controller 2b to OFF. By doing so, through the notification, the extension controller 2b cannot perform the outgoing call from the extension phone 10a or the PC phone 10b, or the incoming call to the extension phone 10a or the PC phone 10b and is suffered from the function restriction of the PBX operational function (Step S130). Then, in a case in which the enciphered file is not set or in which log-in information having a different value is set, the steps S100 to S130 are repeated, and thus the PBX 2 is maintained to a state in which the function is restricted.

—Read Identification Request—

Next, if the request to read of the PBX-ID is made by the reader 3c of the terminal device 3, the process progresses to a step S140 through the judgment in the step S100. The controller 2g of the PBX 2 reads the PBX-ID from the memory 2d and transmits the PBX-ID to the terminal device 3 via the interface 2c (Step S150, a PBX-ID reading step).

The terminal controller 3g of the terminal device 3 receives the PBX-ID from the PBX 2 via the local interface 3a and stores the PBX-ID in the memory 3f by the reader 3c.

The terminal device 3 accesses to the management server 4 via the network interface 3b. This access can be performed by assigning a URL (Uniform Resource Locator), which represents an address of the management server 4, with a browser, which runs on the terminal device 3 (Step S160).

With the access from the terminal device 3, the management server 4 transmits an authentication request screen of a web page from the authenticator 4b to the terminal device 3 via the network interface 4a (S170).

The installer 14 inputs the log-in information, which is issued from the dealer in advance, into the authentication request screen displayed on a display unit (not shown) of the terminal device 3 with a keyboard or the like and transmits the input log-in information to the management server 4 (Step S180).

Based on the log-in information of the installer 14 transmitted from the terminal device 3, the management server 4 searches the installation date management database 4d. For example, in FIG. 6, the management server 4 searches dealer ID data 134 to confirm whether or not a dealer ID is in concord with the log-in information. Moreover, as described above, dealer ID data 134 may be separated from the installation date management database 4d to independently construct a database for authentication.

As a search result of dealer ID data 134, when the authenticator 4b authenticates the installer 14, the issuer 4c transmits an authentication issue screen. This authentication issue screen is a screen to cause the installer 14 to input the PBX-ID of the PBX 2 (Step S190).

On the other hand, when the log-in information inputted through the authentication issue screen is in discord with the log-in information of the installer 14 registered in the installation date management database 4d of the management server 4, the authenticator 4b notifies the terminal device 3 of a purport that authentication is not made. By doing so, the management server 4 issues the authentication information to only the terminal device 3, which is used by a specified installer 14.

As for the PBX-ID of the PBX 2, which is read and stored in the memory 3f of the terminal device 3 in advance in the step S150, the installer 14 inputs the PBX-ID into the authentication issue screen displayed on the browser of the terminal device 3 and transmits the PBX-ID from the terminal device 3 to the management server 4 (Step S200, an authentication issue step).

—Authentication—

The management server 4, which receives the PBX-ID, enciphers and issues the authentication information according to the PBX-ID by the issuer 4c. Then, PBX-ID data 132, dealer ID data 134 (log-in information) used at the time of authentication, and date data 133 (date on which the enciphered file is issued) are stored in the installation date management database 4d, in correlating with one another.

In the installation date management database 4d of the management server 4, the PBX-ID and the enciphered file are stored in correlating with the issue date, and thus the dealer can specify the PBX 2 installed in the company 10 from the PBX-ID and can accurately grasp the date on which the PBX 2 is installed and starts to operate (the date on which the enciphered file is issued) (Step S210, an issue step). In addition, only if the installer 14 requests the authentication to the management server 4, the installation date management database 4d is under the management of the manufacturer 15, and thus the date, on which the operation starts, can be prevented from being erroneously reported.

If the enciphered file (enciphered authentication information) is issued, the enciphered file is displayed in the authentication issue screen of the browser, which runs on the terminal device 3 (Step S220). The enciphered file is created by converting the PBX-ID with the issuer 4c of the management server 4. However, since this file is enciphered, the installer 14 cannot see at first sight that the enciphered file (file of enciphered information required for authentication) and the PBX-ID corresponds to each other. By doing so, security of information required for authentication can be ensured.

When the terminal device 3 receives the enciphered file, the enciphered file is displayed on the terminal device 3. The installer 14 causes the writer 3e to output the enciphered file to the PBX 2 (Step S230, an enciphered file writing step). By doing so, the enciphered file is stored in the memory 2d of the PBX 2. Then, as described above, the PBX-ID and the enciphered file are read in the step S110.

Then, as described above, the controller 2g causes the decoder 2e to decode the enciphered file read. In addition, in the step S120, the controller 2g compares the PBX-ID to the decoded enciphered file. In this case, both are in concord with each other, since the enciphered file issued from the management server 4 is decoded as information required for authentication. Therefore, the comparator 2f notifies the controller 2g that the comparison result is in concord. The controller 2g, which receives the notification purporting that the comparison result of the comparator 2f is in concord, controls the function activator 2h to release the function restriction (Step S240). By doing so, the manufacturer or dealer can confirm whether or not the installer 14 has a skill for the setting work of the PBX 2, through authentication when the installer 14 access the management server 4.

As described above, though the computer system according to the first embodiment is described, the terminal device 3 may deliver the PBX-ID and the enciphered file. Further, a terminal device connected to the PBX 2 and a terminal device connected to the management server 4 may be different.

The delivery can be performed using a flexible disc or a portable nonvolatile memory. Further, the installer 14 may input the PBX-ID displayed on a terminal device connected to the PBX 2 to a terminal device connected to the management server 4. To the contrary, the installer 14 may input the enciphered file (information required for authentication) displayed on a terminal device connected to the management server 4 to a terminal device connected to the PBX 2. Further, when the PBX 2 has a display unit or an input unit, such as a console or the like, the terminal device 3 connected to the PBX 2 can be omitted.

According to the first embodiment of the present invention, the date, on which the operation starts, can be prevented from being erroneously reported. Further, when the free warranty term is expired from the date on which the operation starts (the date on which the enciphered file is issued), the controller 2g controls the function activator 2h, for example, to restrict the function such that the extension controller 2b does not operate.

Alternatively, in a case of a month or a week before the free warranty term, the controller 2g can display a warning on a display unit (though not shown, a well-known unit, such as an operation state display LCD (Liquid Crystal Display) or a warning display lamp, or the like can be used) so as to notify of the expiration in advance.

Second Embodiment

Figure 8:
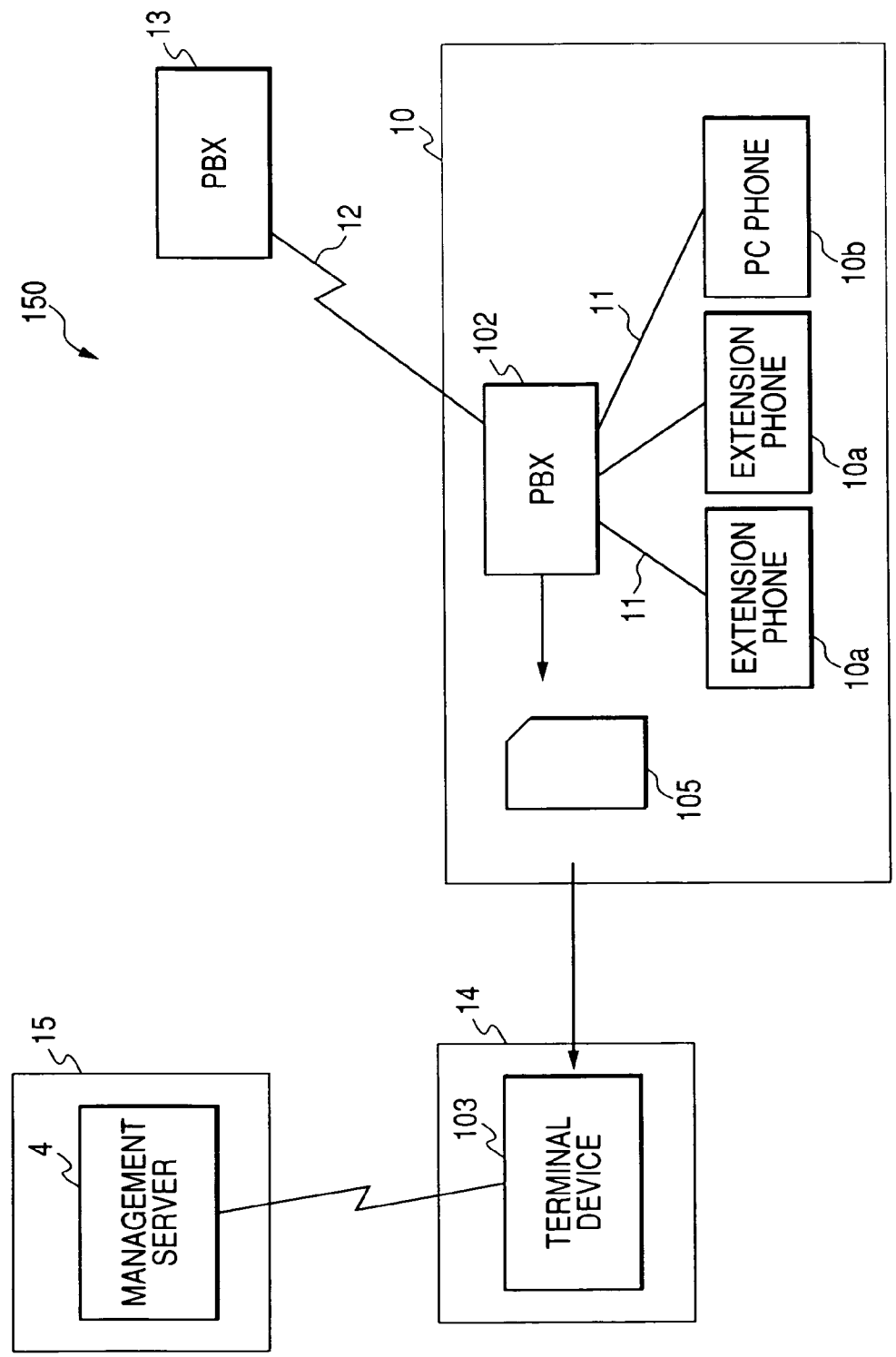
FIG. 8 is a diagram illustrating a configuration of a computer system according to a second embodiment of the present invention.
Figure 9:
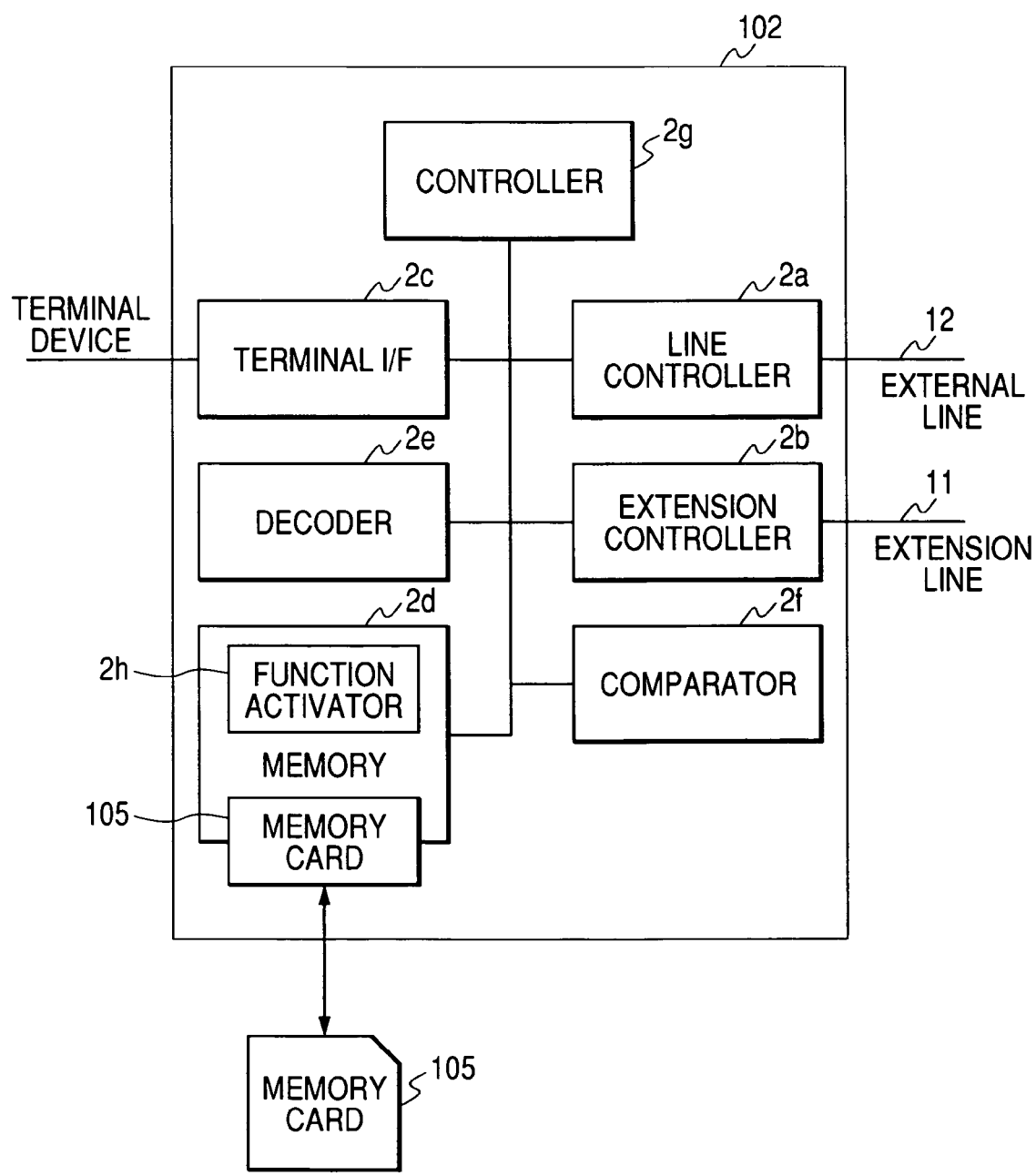
FIG. 9 is a diagram showing a configuration of a private branch exchange of FIG. 8.
Figure 10:
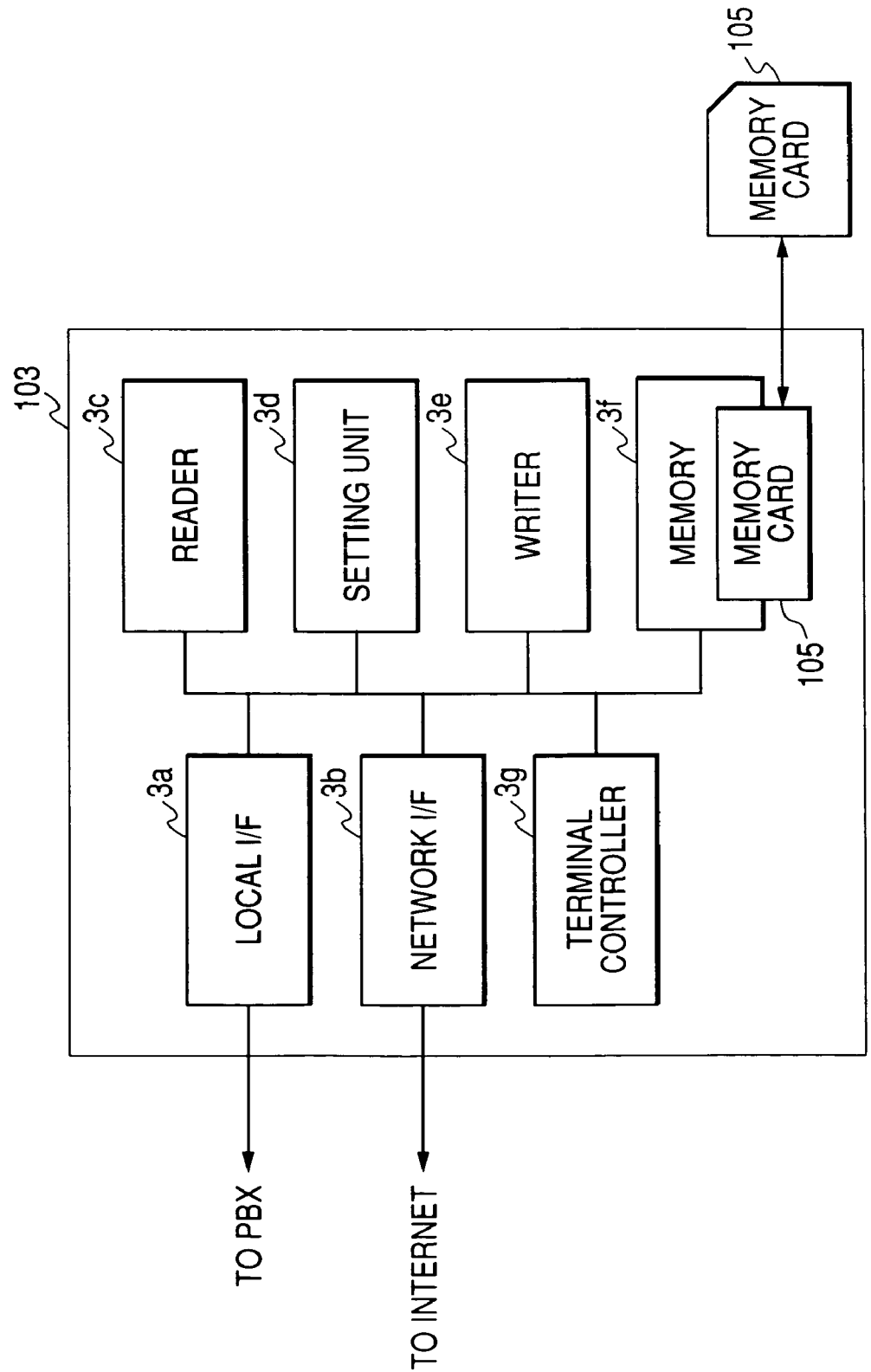
FIG. 10 is a diagram showing a configuration of a terminal device of FIG. 8.

The configuration of a computer system 150 according to a second embodiment of the present invention will be described with reference to FIGS. 8 to 10. FIG. 8 is a diagram illustrating the configuration of the computer system according to the second embodiment of the present invention. FIG. 9 is a diagram showing the configuration of a private branch exchange of FIG. 8. FIG. 10 is a diagram showing the configuration of a terminal of FIG. 8.

—Overall Configuration—

The computer system 150 according to the second embodiment has a feature that the PBX-ID and the enciphered file are stored in a detachable memory (memory card 105), which is an example of a portable nonvolatile memory. Further, in FIGS. 8 to 10, the same parts as those shown in FIGS. 1 to 4 are represented by the same reference numerals, and thus the descriptions thereof will be omitted. Further, in the second embodiment, a terminal device 103 is the same as that of the first embodiment, that is, the terminal device 103 is constituted by a well-known computer, which is generally used. Further, the management server 4 to be used in the second embodiment has the same configuration as that of the management server 4 shown in FIG. 5.

—PBX—

Next, the configuration of a PBX 102 will be described with reference to FIG. 9. In FIG. 9, the PBX 102 has a line controller 2a, an extension controller 2b, an interface 2c, a memory 2d, a decoder 2e, a comparator 2f, a controller 2g, and a function activator 2h.

Further, in FIG. 9, the hardware configuration of the exchange is the same as the content described with reference to FIG. 3 in the first embodiment, and thus, here, FIG. 3 and the description thereof are quoted and the repetitive detailed description will be omitted.

In FIG. 9, there is a difference from FIG. 2 in that a memory card 105, in addition to the memory 2d, is used. The PBX 102 has a unit that can install the memory card 105 (detachable memory) in a portion of a memory area of the memory 2d. Then, the memory card 105 can detachably constitute the memory.

As an example of a detachable memory for storing the PBX-ID of the PBX 102 and the enciphered file (information required for authentication), the memory card 105 is exemplified. The memory area of the PBX 102 can be implemented as a new memory area, which includes the memory card 105, in addition to a main memory (the memory 2d).

As the memory card 105, for example, a nonvolatile memory, such as an SD card (Secure Digital memory card), can be used.

Moreover, in FIG. 9, the hardware configuration of the exchange is the same as the content described with reference to FIG. 3 in the first embodiment, and thus, here, FIG. 3 and the description thereof are quoted and the repetitive detailed description will be omitted.

—Terminal Device—

Like the terminal device 3 of the first embodiment, a terminal device 103 of FIG. 10 has a local interface 3a, a network interface 3b, a reader 3c, a setting unit 3d, a writer 3e, a memory 3f, and a terminal controller 3g. These parts are the same as those of the first embodiment. Therefore, the same parts as those of the first embodiment are represented by the same reference numerals and thus the descriptions thereof will be omitted.

The terminal shown in FIG. 10, in that the memory card 105 is used in addition to the a memory 3f, is different from that of FIG. 2. Whereas it is equivalent to that of FIG. 9 as mentioned above, in that memory card 105 detachably constitute a memory, the PBX-ID of the PBX 102 and the enciphered file (information required for authentication) are stored therein, and a nonvolatile memory, such as an SD card (Secure Digital memory card), can be used as the memory card 105.

—Server—

Further, the management server 4 is the same as the content described with reference to FIG. 5 in the first embodiment, and thus, here, FIG. 5 and the description thereof are quoted and the repetitive detailed description will be omitted.

—Operation—

Figure 11:
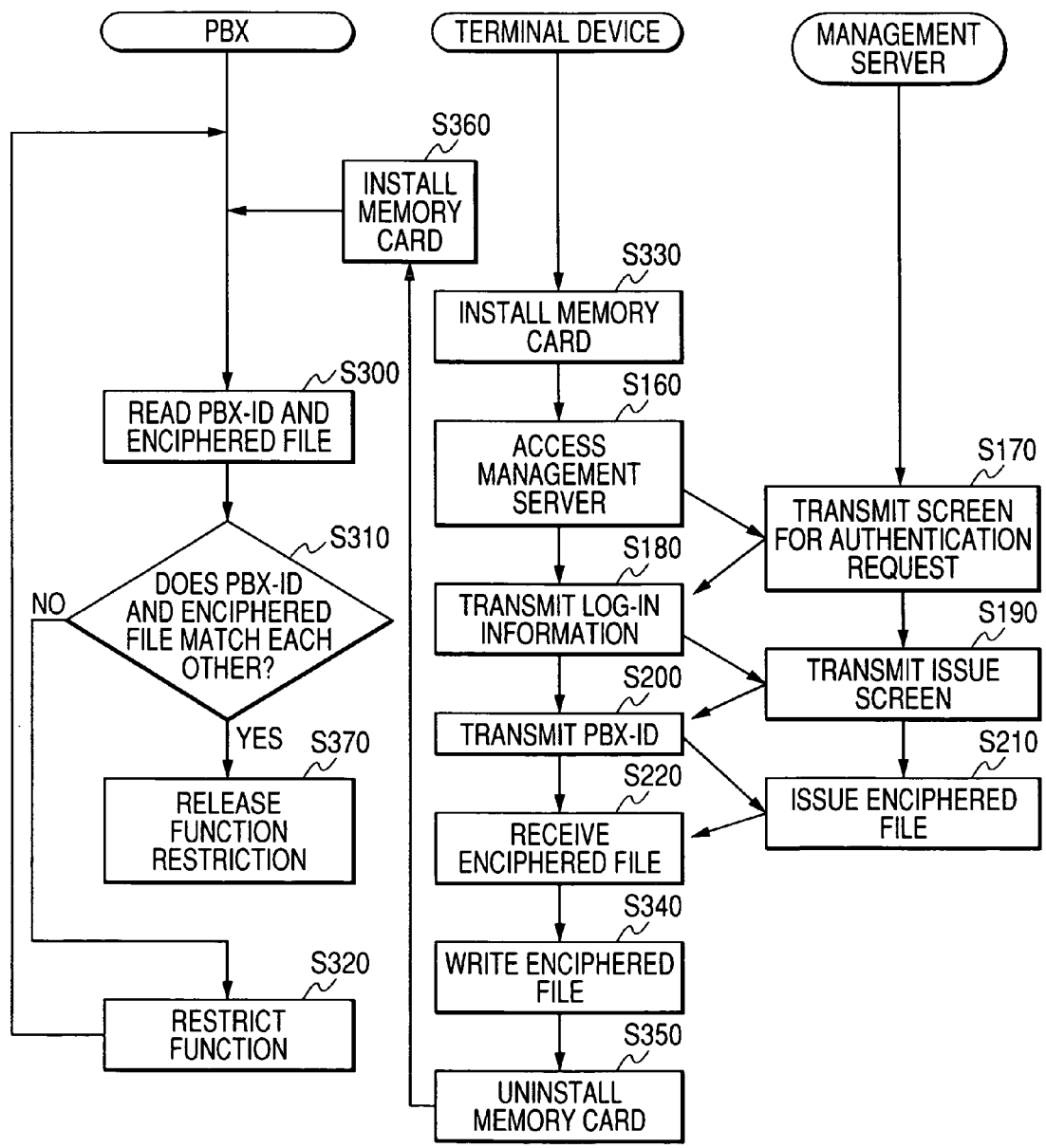
FIG. 11 is a flowchart illustrating an operation of the computer system of FIG. 8.

The operation of the computer system 150 according to the second embodiment of the present invention constituted in such a manner will be described with reference to FIG. 11. FIG. 11 is a flowchart illustrating the operation of the computer system of FIG. 8. FIG. 11 shows the operation when the installer 14 installs the PBX 102 shown in FIG. 8 in the company 10. Therefore, it is assumed that the PBX 102 is regularly shipped with the PBX-ID and the terminal device 103 is connected to the PBX 102 for the installation work.

Further, like the first embodiment, it is assumed that the installer 14 receives training for the installation of the PBX 102 and has a skill for installation. Then, it is assumed that the log-in information to be used for the authentication when the terminal device 103 logs in the management server 4 is issued to the dealer.

—Restriction—

In FIG. 11, first, the PBX 102 reads, from the memory card 105, the PBX-ID and the enciphered file stored in the memory card 105 with the comparator 2f (Step S300). Then, the comparator 2f compares the PBX-ID and the enciphered file read and notifies the controller 2g of the comparison result (Step S310).

In the step S310, if the comparison result notified is in discord, the controller 2g controls the function activator 2h to control the activation flag relating to a predetermined operational function to OFF. For example, the controller 2g controls the function activator 2h to cause the extension controller 2b not to operate. With this control, the extension controller 2b cannot perform the outgoing call from the extension phone 10a or the PC phone 10b or the incoming call to the extension phone 10a or the PC phone 10b (Step S320).

Then, in a case in which the enciphered file is not set or in which an enciphered file of data different from the PBX-ID is read, the steps S300 to S320 are repeated. By doing so, the PBX 2 maintains the state in which the function is restricted.

The installer 14 detaches the memory card 105 from the PBX 102 and installs the memory card 105 in the terminal device 103 (Step S330).

—Authentication—

Next, in order to acquire the enciphered file, the installer 14 operates the terminal device 103, in which the memory card 105 is installed, and accesses the management server 4 via the network interface 3b. The process until the enciphered file is received, after the information required for the authentication is transmitted from the terminal device 103 to the management server 4, is the same as the process of the steps S160 to S220 described with reference to FIG. 7, except that the terminal device 103, instead of the terminal device 3, is used. Therefore, the repetitive description will be omitted.

The terminal device 103 receives the enciphered file and displays that thereon. The installer 14 operates the terminal device 103 and causes the writer 3e to write the enciphered file into the memory card 105 installed in the terminal device 103 (Step S340).

The installer 14 detaches; from the terminal device 103, the memory card 105 after the enciphered file is completely written (S350). The installer 14 installs the memory card 105 in the PBX 102 (Step S360). The enciphered file is decoded by the decoder 2e of the PBX 102 and is stored in the memory 2d. Then, in the step S300, the PBX-ID and the decoded enciphered file are read by the PBX 102.

In the step S310, the PBX-ID and the decoded enciphered file are compared to each other. In this case, both are in concord with each other, since the enciphered file issued from the management server 4 is decoded as information required for authentication. Therefore, the comparator 2f notifies the controller 2g that the comparison result is in concord. The controller 2g, which receives the notification purporting that the comparison result of the comparator 2f is in concord, controls the function activator 2h to release the function restriction (Step S370).

As such, when the portion of the memory area of the memory 2d of the PBX 102 is constituted by the detachable nonvolatile memory card 105, at the time of the installation work, the installer 14 can perform the setting work of the PBX 102 at a different location from the company 10, in which the PBX 102 is installed, without connecting the terminal device 103 to the PBX 102 via a cable or the like. By doing so, the time for the setting work at the company 10 can be reduced and complexity can be reduced.

Third Embodiment

Figure 12:
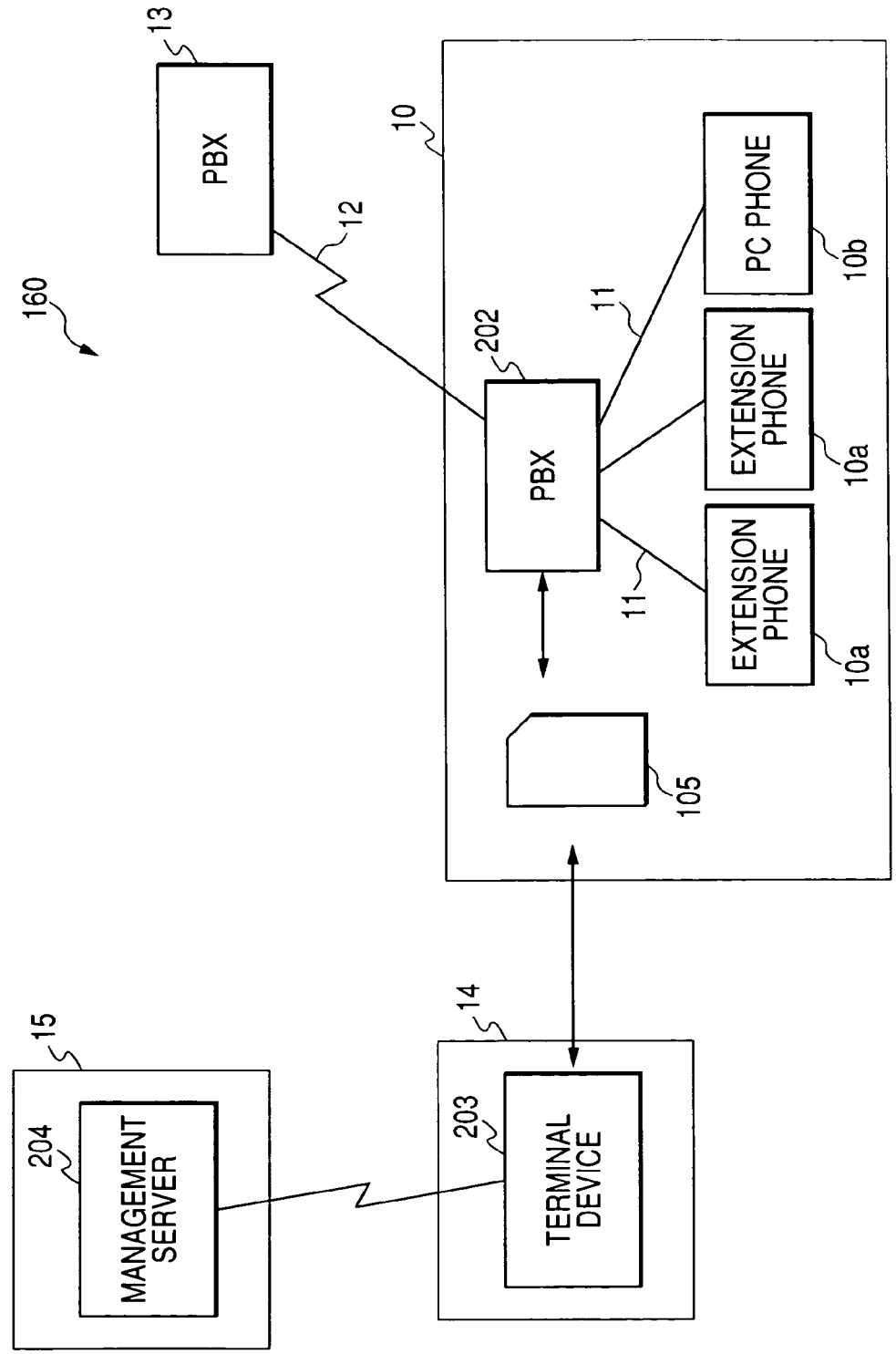
FIG. 12 is a diagram illustrating a configuration of a computer system according to a third embodiment of the present invention.
Figure 13:
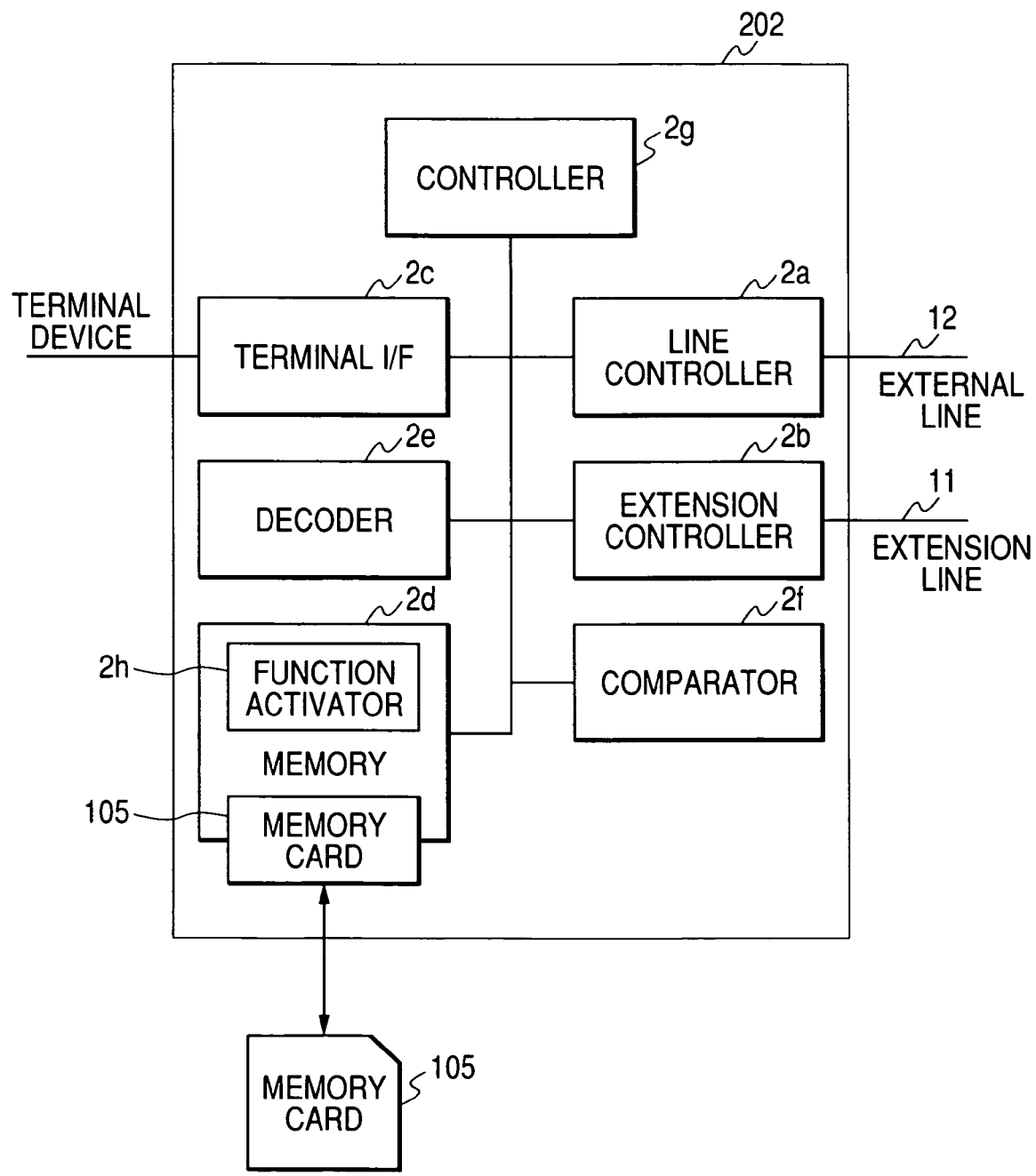
FIG. 13 is a diagram showing a configuration of a PBX of FIG. 12.
Figure 14:
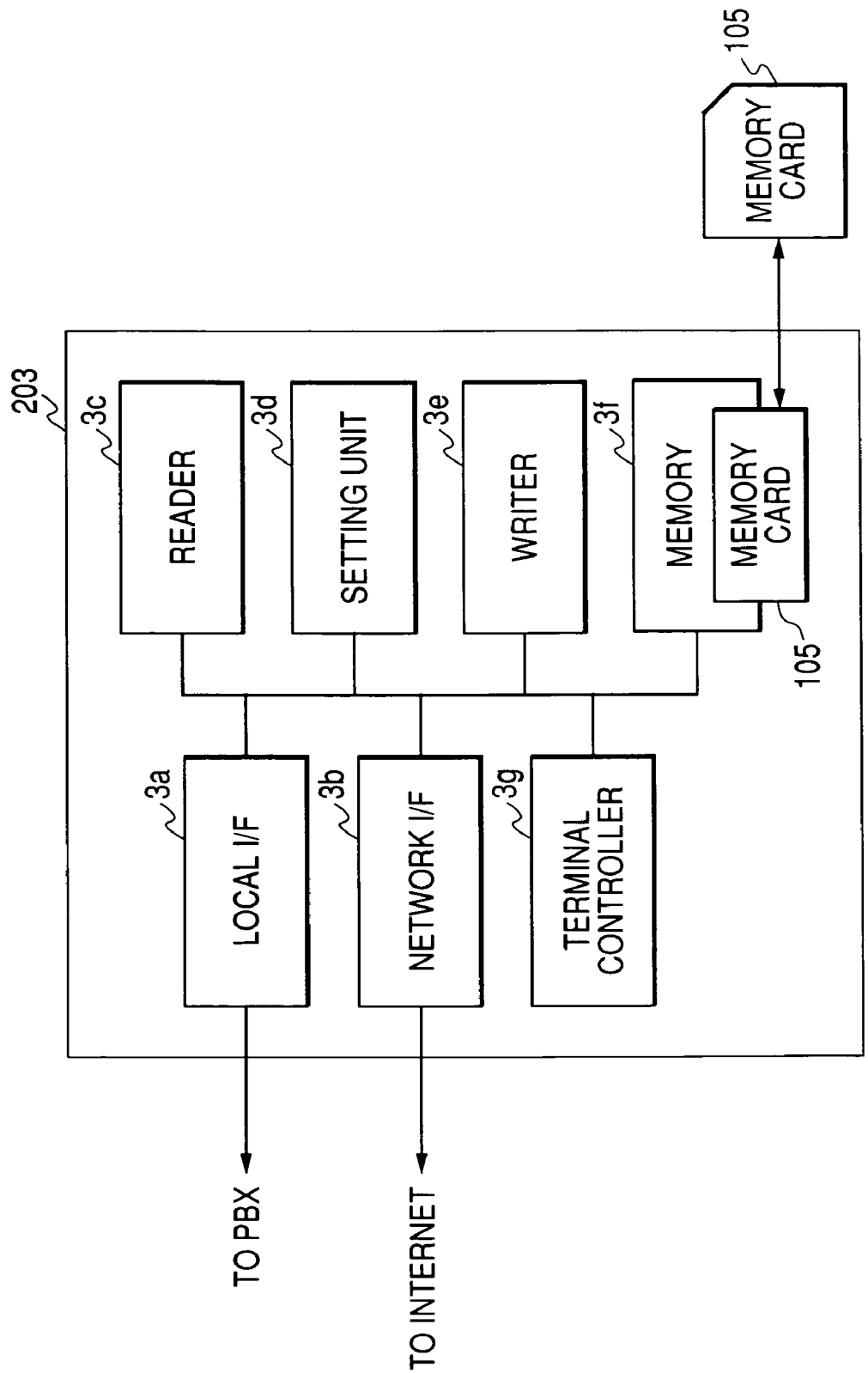
FIG. 14 is a diagram showing a configuration of a terminal device of FIG. 12.
Figure 15:
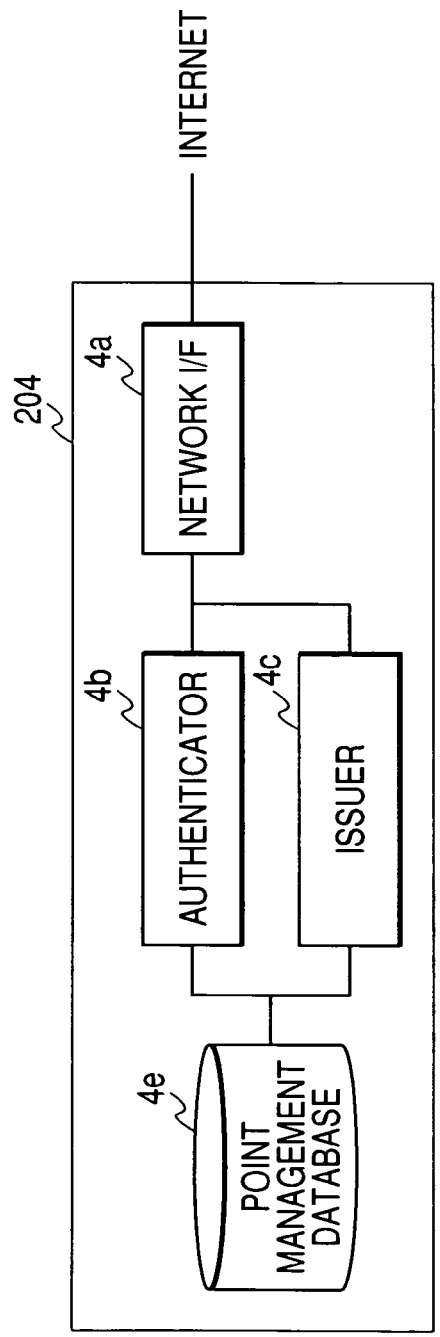
FIG. 15 is a diagram showing a configuration of a management server of FIG. 12.
Figure 16:
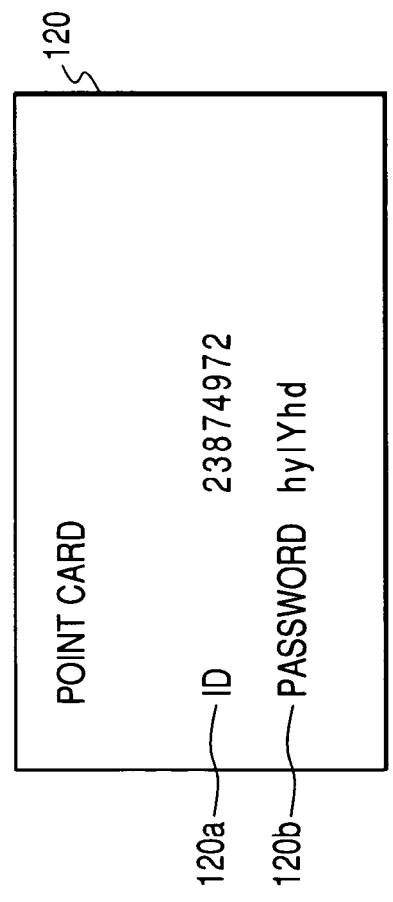
FIG. 16 is a diagram showing an example of a point card according to the third embodiment of the present invention.

The configuration of a computer system 160 according to the third embodiment of the present invention will be described with reference to FIG. 12, when a PBX is used as the computer. FIG. 12 is a diagram illustrating the configuration of the computer system according to the third embodiment of the present invention. FIG. 13 is a diagram showing the configuration of a PBX of FIG. 12. FIG. 14 is a diagram showing the configuration of a terminal device of FIG. 12. FIG. 15 is a diagram showing the configuration of a management server of FIG. 12. FIG. 16 is a diagram showing an example of a point card according to the third embodiment of the present invention.

—Overall Configuration—

As shown in FIG. 12, the computer system 160 has a PBX 202, which is an example of the computer, a terminal device 203, and a management server 204. The detailed contents of the devices are the same as the contents described in the first embodiment. Therefore, only the devices peculiar to the third embodiment are described. Further, the same parts as those in the first embodiment are represented by the same reference numerals and the repetitive descriptions will be omitted. Further, in the third embodiment, like the first embodiment, the terminal 203 and the management server 204 are constituted by the well-known computers, which are generally used.

—PBX—

Next, the configuration of the PBX 202 will be described in detail with reference to FIG. 13. In FIG. 13, the PBX 202 has a line controller 2a that controls the connection to an external line 12, an extension controller 2b that controls the connection to an extension line 11, an interface 2c that enables the connection to the terminal device 203, a memory 2d, a decoder 2e, a comparator 2f, a controller 2g, and a function activator 2h. Further, in FIG. 13, the hardware configuration of the exchange is the same as the content described with reference to FIG. 3 in the first embodiment, and thus, here, FIG. 3 and the description thereof are quoted and the repetitive detailed description will be omitted.

Further, the PBX 202 has a unit that can install a memory card 105 (detachable memory) in a portion of a memory area of the memory 2d. That is, in the third embodiment, both the memory 2d in the first embodiment and the detachable memory card in the second embodiment are provided.

As the memory card 105, for example, a nonvolatile memory, such as an SD card (Secure Digital memory card) can be used. The above-described parts and the detailed hardware configurations thereof are the same as the contents described in the first embodiment. The same parts as those in the first embodiment are represented by the same reference numerals and thus the repetitive descriptions will be omitted.

The memory 2d stores a customer ID (hereinafter, simply referred to as the PBX-ID, like the above-described embodiments), which is computer identification information to identity from another PBX. Therefore, the PBX-ID is preferably stored in a memory area of a nonvolatile memory, such as a flash memory or the like, in which the content can be preserved even when a power supply is not applied.

—ID of SD Card—

In particular, in the third embodiment, the memory card 105 has an individual ID (hereinafter, referred to as a memory card ID) to be identified from another memory card 105. For example, if the memory card 105 is the SD memory card, the manufacturer 15, who manufactures the SD memory card, ships the SD memory card in which information to identify another SD memory card is written in advance as an individual ID, and thus the individual ID can be used in combination with the PBX-ID, which is the computer identification information to identify the PBX from another PBX.

Further, the memory card 105 stores an encrypted license file, (which is an example of an enciphered file in the third embodiment and, hereinafter, is simply referred to as an enciphered file), in addition to the PBX-ID. Therefore, the decoder 2e decodes the license file, similarly to the enciphered file.

In the third embodiment, in the license file (enciphered file), the PBX-ID stored in the memory 2d, classification information that represents the classification of the licensed functional program of the PBX, and term information for the term in which the functional program of the PBX can be executed are included while being enciphered.

—Terminal—

Next, the terminal device 203, which is used by the installer 14, will be described with reference to FIG. 14. Like the terminal device 3 of the first embodiment, the terminal device 203 of the FIG. 14 has a local interface 3a, a network interface 3b, a reader 3c, a setting unit 3d, a writer 3e, a memory 3f, and a terminal controller 3g. These parts are the same as those in the first embodiment. Therefore, the same parts as those in the first embodiment are represented by the same reference numerals and thus the descriptions thereof will be omitted.

The terminal device 203 is different from the terminal device of FIG. 4 in that the memory card 105 is used, in addition to the memory 3f. The third embodiment has the same configuration as that of FIG. 9 in the above-described second embodiment in that the memory card 105 can constitute a detachable memory, the PBX-ID of the PBX 202 and the enciphered file (information required for authentication) are stored, and a nonvolatile memory, such as an SD card (Secure Digital memory card), is used as an example of the memory card 105.

—Server—

Next, the management server 204, which is managed by a manufacturing company 15 (manufacturer or dealer), will be described with reference to FIG. 15. Moreover, the configuration content of the management server 204 exhibits the respective functional units with respect to software having characteristic functions in a general computer or a general personal computer (PC). Further, the detailed structure of the management server 204 is constituted by a well-known computer, which is generally used. These are the same as the contents described in the first embodiment.

In FIG. 15, the management server 204 has a network interface 4a, an authenticator 4b, and an issuer 4c, like the contents described in the first embodiment. Further, the installation date management database 4d described in the first embodiment may be used together.

Moreover, the detailed contents are the same as the contents described in the first embodiment, and thus only the devices peculiar to the third embodiment are described. Further, the same parts as those in the first embodiment are represented by the same reference numerals and thus the repetitive descriptions will be omitted.

In addition, the management server 204 further has a point management database 4e so as to manage a sale point according to a sale price of the sold point card 120 in correlating with point card identification information (point card ID) 120a given to a point card 120.

—Point Card—

Here, the point card will be described with reference to FIG. 16. The point card 120 is a medium of a paper card and, on the surface thereof, the point card ID 120a and a password 120b are given.

The point card ID 120a and the password 120b are given on the surface of the point card 120 by directly printing them on the paper card or by adhering a seal, on which the point card ID 120a and the password 120b are printed. Further, a magnetic tape, in which the contents of the point card ID 120a and the password 120b are recorded, can be adhered. In this case, the terminal device 203 needs have a reader, and thus it is preferable to print the point card ID 120a and the password 120b on the paper card. Further, the point card 120 preferably has the point card ID 120a and the password 120b printed thereon, and thus a plastic card may also be used. When the paper card is used, the point card can be produced in large quantities at low cost.

The point card ID 120a is point card identification information, which is allocated for each point card 120. In the third embodiment, since the point card ID 120a is a serial number, the ID of another point card can be easily reminded. Therefore, in addition to the point card ID 102a, the password 120b, which is not the serial number, is given to the point card 120. Accordingly, when a license is issued, if the point card ID 120a and the password 120b are requested as information to specify the point card 120, it is possible to prevent the point card ID from being erroneously inputted or to prevent another ID from being deduced.

—Point Issue—

FIG. 17 is a diagram illustrating recorded contents of the point management database 4e. FIG. 17 illustrates a case in which the functions of the PBX are managed in correlating with the point. The entire point management database 141 corresponds to the point management database 4e. In FIG. 17, the entire point management database 141 is formed with two data of data A141a for managing the relationship between the functions of the PBX and the point and data A141b for managing the point of the point card ID.

Expiration date management data 142 is data of an expiration date corresponding to a PBX function PBX function data 143 is management data of each PBX function. Point data 144 represents the point corresponding to expiration date management data 142 and PBX function data 143. In the table, (dot) represents that a representative is shown and many data are omitted. Expiration management data 142, PBX unction data 143, and point data 144 constitute the relationship between the functions of the PBX and the point.

The point card ID 145 corresponds to the above-described point card ID 120a A remaining point 146 represents the point possessed by the point card ID 145. The point card ID 145 and the remaining point 146 constitute data for managing the point. Moreover, these management data are examples for the description of the third embodiment. Other management conditions may be added, in addition to the above-described management data.

Returning to FIG. 15, as described in the first embodiment, the issuer 4c has a function of enciphering and issuing the license file (that is, issuing the enciphered file). As regards the issue of the enciphered file, the combination of the log-in information in the authentication request (see the step S180 of FIG. 11), the PBX-ID, the customer ID, the classification information representing the classification of a function realization program executed by the PBX 202 requested (PBX function data 143), expiration date management data 142 representing an available term, and the like, or data including them can be used.

When issuing the license file, the issuer 4c searches the point management database 4e based on the ID 120a (point card ID 145) given to the point card 120. A point for license issue, which is allocated for each classification of the program (PBX function data 143), is subtracted from the sale point correlated with the ID 120a, and the subtraction result is set as the remaining point 146. The license file (enciphered file) enciphered by the issuer 4c can be decoded by the decoder 2e of the PBX 202.

—Overall Operation/Selling—

The operation of the computer system according to the present embodiment constituted in such a manner will be described with reference to FIG. 18. FIG. 18 is a diagram illustrating the operation of the computer system of FIG. 12.

First, selling of the point card will be described. The manufacturer 15 sells the point card 120, to which the ID 120a and the password 120b are given, to the dealer in advance (Step S511) and collects bills from the dealer (Step S512).

The dealer sells the point card 120 to the installer 14, who installs the PBX 202 (Step S521) and collects bills from the installer 14 (Step S522).

As for the sold point card 120, a purchase point according to a purchase price are managed in the point management database 4e of the management server 204 installed in the manufacturing company 15 in correlating with the ID 120a given to the point card 120 (see FIG. 17, and, in this case, the remaining point 146 is equal to the purchase point. For example, the remaining point of 25 is managed as the purchase point (see the point in the server 204 of FIG. 18).

—Installation—

Next, the installer 14 causes the terminal device 203 to the PBX 202 to read the PBX-ID registered in the memory 2d of the PBX 202 (Step S531).

Then, the installer 14 accesses the management server 204 via the network interface 3b of the terminal device 203 (Step S532). This access can be performed by assigning a URL (Uniform Resource Locator), which represents an address of the management server 204, using a browser, which runs on the terminal device 203.

—Authentication—

With the access from the terminal device 203, the management server 204 performs a request to authenticate from the authenticator 4b to the terminal device 203 via the network interface 4a.

According to the display of the authentication request screen displayed on the terminal device 203, the installer 14, who operates the terminal device 203, inputs the authentication information assigned from the manufacturer 15 or the dealer to get the authentication. As described above, the authentication information is the log-in information for the authentication request, the PBX-ID, and the customer ID.

Then, the ID 120a and password 120b of the point card 120 are inputted, a program to purchase is inputted, and these are transmitted as a license request notification to the management server 204, together with the PBX-ID (customer ID) (Step S532, a license request step).

Moreover, in the third embodiment described above, the example in which the PBX-ID (customer ID) registered in the memory 2d of the PBX 202 is used as the information to identify the PBX from another PBX. As another example, the memory card ID stored in the memory card 105 may be used. Both of them may be used. When the memory card ID stored in the memory card 105 is used, the memory card 105, in which the PBX-ID is stored, is removed from the PBX 202 of a customer and is installed in the terminal device 203 to be incorporated into the terminal device 203 (see the above-described second embodiment). For this reason, an effort for connecting the terminal device 203 to the PBX 202 can be omitted.

Moreover, as for the memory card ID stored in the memory card 105, when the memory card ID, instead of the PBX-ID, is used, the memory card ID is replaced or improperly used. Here, in order to prevent the improper use, preferably, the PBX-ID stored in the PBX 202 is used or both of them are used, thereby increasing security.

—Issue—

After the authentication is completed, the management server 204, which receives the license request notification, causes the issuer 4c to encipher and issue the license file including the classification information according to the classification of the purchased program via the network interface 4a. Further, the management server 204 searches the point management database 4e and subtracts the point for license issue, which are allocated for each classification of the program (see PBX function data 143 in FIG. 17), from the sale point (Step S541, a license issue step).

A point obtained by subtracting point data 144 from the remaining point 146 corresponding to the point card ID 145 of the customer are updated and registered as a new remaining point 146 in the point management database 4e. Moreover, when the remaining point 146 of the subtraction result is negative, of course, there is no case in which the step of enciphering and issuing the license file (Step S541) is executed.

For example, when four extension lines are added, the point for license issue is one point (see A1 of function data 143 of FIG. 17 and the sale point in the management server of FIG. 18). Therefore, the point card 120 of ID1 (see "23874971" of the point card D 145 in FIG. 17) has the remaining point 146 of 25, and thus, if the installer 14 uses ID1, the remaining point 146 becomes 24 points.

In the license file, the PBX-ID, the customer ID, the classification information representing the function of the program the term information representing the expiration date, in which the program can be used, and the like are included while being enciphered (that is, the license file is the enciphered file). The terminal controller 3g of the terminal device 203, which receives the enciphered file issued, writes the enciphered file into the memory card 105 (Step S542, an enciphered file writing step).

The installer 14 installs the memory card 105, in which the license file is stored, in the PBX 202 (Step S543, a function activating step). The PBX 202 causes the decoder 2e to decode the enciphered file stored in the memory card 105 and reads the decoded enciphered file. The PBX 202 causes the comparator 2f to compare the PBX-ID (customer ID) in the enciphered file to the PBX-ID (customer ID) registered in advance. Then, only when the comparison result is in concord, the controller 2g controls the function activator 2h to enable the functional block of the program corresponding to the classification information (see PBX function data 143 in FIG. 17) in the enciphered file.

Further, when the functional block of the program is enabled, the controller 2g of the PBX 202 refers to the term information corresponding to expiration date management data 142, judges whether or not the term is expired, and, if it is judged that the term is not expired, executes the program. In a case of a month or a week before the term is expired, the controller 2g can display a warning on a display unit (though not shown, a well-known unit, such as an operation state display LCD (Liquid Crystal Display) or a warning display lamp, or the like can be used) so as to notify of the expiration in advance.

Then, the installer 14 performs an addition work of the function of the PBX 202, collects bills from the customer, and ends the construction (Step S544).

As such, the customer can get the enciphered file issued from the management server 204 for each function of the program, and thus it is preferable to purchase desired respective functions. Further, when the customer adds the functions of the PBX 202, the installer 14, who performs the installation construction, has to purchase the point card 120 in advance. Thus, the dealer can avoid a risk in collecting development costs.

Further, since the point for license issue (see point data 144) is allocated according to the license (see PBX function data 143), the point for license issue can be allocated according to the development costs or the point for license issue can be allocated according to severity of the function. Further, since the license file (enciphered file) is stored in the memory card 105, even when the PBX 202 has a trouble and is substituted with a substitute, only by changing the memory card 105, the operation can be achieved under the same circumstance.

Moreover, in the above-described embodiment, for simplicity, the example of the function of A1 of PBX function data 143 is described as the case in which the four extension lines are added. However, the present invention is not limited to this example, but, for example, a plurality of PBX function data may be purchased and the enciphered file (memory card 105) may be issued. Further, to the contrary, a plurality of enciphered files (memory card 105) may be issued for each PBX function data 143.

Further, the example in which the memory card 105 and the point card 120 are used as separate mediums is described, but the point card ID 120a and the password 120b may be formed in an electronic form and may be used to be integrated into the memory card 105.

In addition, though the first to third embodiments are described, the computer system may be constructed in combination of these embodiments. In this case, a lack of unity of the invention does not occur.

According to the computer system of the present invention, it is possible to prevent an installer, who lacks skill, from being involved in the setting work at the time of the installation work. Further, it is possible to accurately grasp the operation time of the computer, which is installed in the management server. Therefore, a trouble due to an erroneous input in the installation work of the computer, which requires a complex setting work, can be prevented from occurring.

Since the license can be given with no complex management, the present invention is suitable for a computer system having a management server that manages and gives a license for permitting the execution of the program and a computer that is executed with the given license, and a method of giving a license.

This application is based upon and claims the benefit of priorities of Japanese Patent Application Nos. 2004-205657 filed on Jul. 13, 2004, 2005-150392 filed May 24, 2005, and 2005-199656 filed Jul. 8, 2005, the contents of which are incorporated herein by reference in its entirety

What is claimed is:

1. A computer system comprising:
a private branch exchange (PBX) that connects calls among a plurality of extension lines or among extension lines and external lines and that is connectable to another terminal device;
a management server; and
a terminal device that is connectable to the PBX and that is connectable to the management server via a network,
wherein the PBX includes:
  a line controller that controls connection or disconnection with respect to an incoming call or an outgoing call from a public network or a private line via an external line;
  an extension controller that controls connection or disconnection of an extension line and the call;
  an interface that connects the PBX to the terminal device;
  a memory that stores a control program of the PBX and identification information to identify the PBX from another PBX;
  a decoder that decodes an enciphered file serving as enciphered authentication information;
  a comparator that compares the identification information to the enciphered file decoded by the decoder; and
  a controller that controls the PBX based on the stored content of the memory, the terminal device includes:
  a local interface that connects the terminal device to the PBX;
  a network interface that connects the terminal device to the management server via the network;
  a reader that reads the identification information from the PBX;
  a memory that stores the identification information, the enciphered file, and the control program of the terminal device; and
  a terminal controller that controls the local interface, the network interface, and the reader,
the management server includes:
  a network interface that connects the management server to the terminal device via the network;
  an authenticator that receives a request for authentication when the terminal device logs in the management server;
  an issuer that issues the enciphered file enciphered according to the identification information received from the terminal device after the authentication of the authenticator; and
  an installation date management database that stores a date, on which the enciphered file is issued, in correlating with the identification information,
the PBX further includes a function activator that assigns whether to restrict or activate a part or all of operational functions of the PBX, and the controller controls the function activator based on the comparison result of the comparator to assign whether to restrict or activate the part or all of the operational functions of the PBX.

2. The computer system according to claim 1 wherein:
the terminal device is connected to the interface of the PBX via the local interface thereof to read the identification information from the PBX by the reader and to store the identification information therein,
the terminal device is connected to the management server via the network interface and transmits the identification information stored therein to the management server after the authentication of the authenticator,
the management server issues the enciphered file to the terminal device based on the identification information,
the terminal device stores the enciphered file in the memory and is connected to the interface of the PBX, and
based on the comparison result of the comparator, the controller of the PBX controls the function activator to restrict the part or all of the operational functions of the PBX when the comparison result is in discord and controls the function activator to enable a predetermined operational function or all of the operational functions of the PBX when the comparison result is in concord.

3. The computer system according to claim 1, wherein, after a predetermined free warranty term passes from the date on which the management server issues the enciphered file, the controller of the PBX controls the function activator to restrict the part or all of the operational functions of the PBX.

4. The computer system according to claim 3, wherein, before the predetermined free warranty term passes from the date on which the management server issues the enciphered file, the controller of the PBX reports a warning.

5. The computer system according to claim 1, wherein:
each of the memory of the PBX and the memory of the terminal device detachably has a detachable memory in a part of a memory area,
the detachable memory stores the identification information of the PBX and the enciphered file of the PBX in advance, and
based on the comparison result of the comparator, the controller of the PBX controls the function activator to restrict the part or all of the operational functions of the PBX when the comparison result is in discord and controls the function activator to enable a predetermined operational function or all of the operational functions of the PBX when the comparison result is in concord.

6. The computer system according to claim 1, wherein:
each of the memory of the PBX and the memory of the terminal device detachably has a detachable memory in a part of a memory area,
the detachable memory stores the identification information of the PBX and the enciphered file of the PBX in advance, the management server further has a point management database that stores the functions of the PBX, a point corresponding to a sale price, point card identification information for identifying an individual point, and a remaining point of the point in the point card identification information in correlating with one another, and a point card is sold while the point card identification information is displayed in advance thereon and the remaining point is stored in the point management database in correlating with the point card identification information and the sale price, at the time of installation, the terminal device is connected to the management server via the network interface thereof and, after passing the authentication by the authenticator, transmits the identification information stored in the detachable memory, the point card identification information, and a function of the PBX to purchase with respect to the PBX to the management server, the management server issues to the terminal device a new enciphered file according to the function of PBX to purchase and updates the remaining point by subtracting a point corresponding to the function of the PBX to purchase from the remaining point of the point management database, the terminal device records the new enciphered file issued from the management server in the detachable memory, and based on the comparison result of the comparator, the controller of the PBX connected to the detachable memory, in which the new enciphered file is recorded, controls the function activator to restrict the part or all of the operational functions of the PBX when the comparison result is in discord and controls the function activator to enable a predetermined operational function or all of the operational functions of the PBX when the comparison result is in concord.

7. A computer system comprising:

a private branch exchange (PBX) that connects calls among a plurality of extension lines or among extension lines and external lines and that is connectable to another terminal device;

a management server; and a terminal device that is connectable to the PBX and that is connectable to the management server via a network, wherein the PBX includes:

a line controller that controls connection or disconnection with respect to an incoming call or an outgoing call from a public network or a private line via an external line;

an extension controller that controls connection or disconnection of an extension line and the call;

an interface that connects the PBX to the terminal device;

a memory that stores a control program of the PBX and identification information to identify the PBX from another PBX;

a decoder that decodes an enciphered file serving as enciphered authentication information;

a comparator that compares the identification information to the enciphered file decoded by the decoder;

a controller that controls the PBX based on the stored content of the memory; and a detachable memory that is detachably constituted in a portion of a memory area of the memory and stores the identification information and the enciphered file of the PBX in advance therein, the terminal device includes:

a local interface that connects the terminal device to the PBX;

a network interface that connects the terminal device to the management server via the network;

a reader that reads the identification information from the PBX;

a memory that stores the identification information, the enciphered file, and the control program of the terminal device;

a detachable memory that is detachably constituted in a portion of a memory area of the memory; and a terminal controller that controls the local interface, the network interface, and the reader, the management server includes:

a network interface that connects the management server to the terminal device via the network;

an authenticator that receives a request for authentication when the terminal device logs in the management server;

an issuer that issues the enciphered file enciphered according to the identification information received from the terminal device after the authentication of the authenticator; and an installation date management database that stores a date, on which the enciphered file is issued, in correlating with the identification information, at the time of installation, the terminal device is connected to the management server via the network interface thereof and, after passing the authentication by the authenticator, transmits the identification information stored in the detachable memory to the management server, the management server issues a new enciphered file based on the identification information to the terminal device, the terminal device records the new enciphered file in the detachable memory, and based on the comparison result of the comparator, the controller of the PBX connected to the detachable memory, in which the new enciphered file is recorded, controls a function activator to restrict the part or all of the operational functions of the PBX when the comparison result is in discord and controls the function activator to enable a predetermined operational function or all of the operational functions of the PBX when the comparison result is in concord.

8. The computer system according to claim 7, wherein, after a predetermined free warranty term passes from the date on which the management server issues the enciphered file, the controller of the PBX controls the function activator to restrict the part or all of the operational functions of the PBX.

9. The computer system according to claim 8, wherein, before the predetermined free warranty term passes from the date on which the management server issues the enciphered file, the controller of the PBX reports a warning.

10. A computer system comprising:

a private branch exchange (PBX) that connects calls among a plurality of extension lines or among extension lines and external lines and that is connectable to another terminal device;

a management server; and a terminal device that is connectable to the PBX and that is connectable to the management server via a network, wherein the PBX includes:

a line controller that controls connection or disconnection with respect to an incoming call or an outgoing call from a public network or a private line via an external line;

an extension controller that controls connection or disconnection of an extension line and the call;

an interface that connects the PBX to the terminal device;

a memory that stores a control program of the PBX and identification information to identify the PBX from another PBX;

a decoder that decodes an enciphered file serving as enciphered authentication information;

a comparator that compares the identification information to the enciphered file decoded by the decoder;

a controller that controls the PBX based on the stored content of the memory; and a detachable memory that is detachably constituted in a portion of a memory area of the memory and stores the identification information and the enciphered file of the PBX therein in advance, the terminal device includes:

a local interface that connects the terminal device to the PBX;

a network interface that connects the terminal device to the management server via the network;

a reader that reads the identification information from the PBX;

a memory that stores the identification information, the enciphered file, and the control program of the terminal device;

a terminal controller that controls the local interface, the network interface, and the reader; and a detachable memory that is detachably constituted in a portion of a memory area of the memory, the management server includes:

a network interface that connects the management server to the terminal device via the network;

an authenticator that receives a request for authentication when the terminal device logs in the management server;

an issuer that issues the enciphered file enciphered according to the identification information received from the terminal device after the authentication of the authenticator; and a point management database that stores the functions of the PBX, a point corresponding to a sale price, point card identification information for identifying an individual point, and a remaining point of the point in the point card identification information in correlating with one another, at the time of installation, the terminal device is connected to the management server via the network interface thereof and, after passing the authentication by the authenticator, transmits the identification information stored in the detachable memory, the point card identification information, and a function of the PBX to purchase with respect to the PBX to the management server, the management server issues to the terminal device a new enciphered file according to the function of PBX to purchase and updates the remaining point by subtracting a point corresponding to the function of the PBX to purchase from the remaining point of the point management database, the terminal device records the new enciphered file issued from the management server in the detachable memory, and based on the comparison result of the comparator, the controller of the PBX connected to the detachable memory, in which the new enciphered file is recorded, controls a function activator to restrict a part or all of operational functions of the PBX when the comparison result is in discord and controls the function activator to enable a predetermined operational function or all of the operational functions of the PBX when the comparison result is in concord.

11. The computer system according to claim 10, wherein the management server refers to the point management database and, when available term management data does not pass, issues the new enciphered file.

12. The computer system according to claim 11, wherein the management server refers to the point management database, and, in a case of a predetermined term before available term management data passes, the controller of the PBX reports a warning.

13. The computer system according to claim 11, wherein, when the remaining point is negative, the management server does not issue the new enciphered file.

14. A control method of a computer system, which has a private branch exchange (PBX) that connects calls among a plurality of extension lines or among extension lines and external lines and that is connectable to another terminal device, a management server, and a terminal device that is connectable to the PBX and that is connectable to the management server via a network, the PBX having:

a line controller that controls connection or disconnection with respect to an incoming call or an outgoing call from a public network or a private line via an external line;

an extension controller that controls connection or disconnection of an extension line and the call;

an interface that connects the PBX to the terminal device;

a memory that stores a control program of the PBX and identification information to identify the PBX from another PBX;

a decoder that decodes an enciphered file serving as enciphered authentication information;

a comparator that compares the identification information to the enciphered file decoded by the decoder; and a controller that controls the PBX based on the stored content of the memory, the terminal device having:

a local interface that connects the terminal device to the PBX;

a network interface that connects the terminal device to the management server via the network;

a reader that reads the identification information from the PBX;

a memory that stores the identification information, the enciphered file, and the control program of the terminal device; and a terminal controller that controls the local interface, the network interface, and the reader, the management server having:

a network interface that connects the management server to the terminal device via the network;

an authenticator that receives a request for authentication when the terminal device logs in the management server;

an issuer that issues the enciphered file enciphered according to the identification information received from the terminal device after the authentication of the authenticator; and an installation date management database that stores a date, on which the enciphered file is issued, in correlating with the identification information, the control method of a computer system comprising:

a PBX-ID reading step of connecting the terminal device to the interface of the PBX via the local interface thereof to read the identification information from the PBX by the reader and to store the identification information in the terminal device;

an authentication issue step of connecting the terminal device to the management server via the network interface thereof and, after passing the authentication by the authenticator, transmitting the identification information stored in the terminal device to the management server;

an issue step of allowing the management server to issue the enciphered file to the terminal device based on the identification information;

an enciphered file writing step of allowing the terminal device to store the enciphered file in the memory and to be connected to the interface of the PBX; and a function activating step of allowing the controller of the PBX to control a function activator, based on the comparison result of the comparator, to restrict a part or all of operational functions of the PBX when the comparison result is in discord and to control the function activator to enable a predetermined operational function or all of the operational functions of the PBX when the comparison result is in concord.

15. A control method of a computer system, which has a private branch exchange (PBX) that connects calls among a plurality of extension lines or among extension lines and external lines and that is connectable to another terminal device, a management server, and a terminal device that is connectable to the PBX and that is connectable to the management server via a network, the PBX having:
a line controller that controls connection or disconnection with respect to an incoming call or an outgoing call from a public network or a private line via an external line;
an extension controller that controls connection or disconnection of an extension line and the call;
an interface that connects the PBX to the terminal device;
a memory that stores a control program of the PBX and identification information to identify the PBX from another PBX;
a decoder that decodes an enciphered file serving as enciphered authentication information;
a comparator that compares the identification information to the enciphered file decoded by the decoder;
a controller that controls the PBX based on the stored content of the memory; and
a detachable memory that is detachably constituted in a portion of a memory area of the memory and stores the identification information and the enciphered file of the PBX therein in advance, the terminal device having:
a local interface that connects the terminal device to the PBX;
a network interface that connects the terminal device to the management server via the network;
a reader that reads the identification information from the PBX;
a memory that stores the identification information, the enciphered file, and the control program of the terminal device;
a terminal controller that controls the local interface, the network interface, and the reader; and
a detachable memory that is detachably constituted in a portion of a memory area of the memory, the management server has:
a network interface that connects the management server to the terminal device via the network;
an authenticator that receives a request for authentication when the terminal device logs in the management server;
an issuer that issues the enciphered file enciphered according to the identification information received from the terminal device after the authentication of the authenticator; and
a point management database that stores the functions of the PBX, a point corresponding to a sale price, point card identification information for identifying an individual point, and a remaining point of the point in the point card identification information in correlating with one another, the control method of a computer system comprising:

a license request step of connecting the terminal device to the management server via the network interface thereof for installation and, after passing the authentication by the authenticator, transmitting the identification information stored in the detachable memory, the point card identification information, and a function of the PBX to purchase with respect to the PBX to the management server;

a license issue step of allowing the management server to issue a new enciphered file according to the function of the PBX to purchase to the terminal device and to update the remaining point by subtracting a point corresponding to the function of the PBX to purchase from the remaining point of the point management database;

an enciphered file writing step of allowing the terminal device to record the new enciphered file issued from the management server in the detachable memory; and a function activating step of allowing the controller of the PBX to control a function activator, based on the comparison result of the comparator, to restrict a part or all of operational functions of the PBX when the comparison result is in discord and to control the function activator to enable a predetermined operational function or all of the operational functions of the PBX when the comparison result is in concord.

* * * * *